(12) United States Patent
Quaid

(10) Patent No.: US 8,464,603 B2
(45) Date of Patent: Jun. 18, 2013

(54) PARALLELOGRAM BASED ACTUATING DEVICE

(75) Inventor: Arthur Quaid, Hollywood, FL (US)

(73) Assignee: Vivero One Research, LLC, Hollywood, FL (US)

( * ) Notice: Subject to any disclaimer, the term of this patent is extended or adjusted under 35 U.S.C. 154(b) by 0 days.

(21) Appl. No.: 13/236,245

(22) Filed: Sep. 19, 2011

(65) Prior Publication Data

US 2013/0068054 A1    Mar. 21, 2013

(51) Int. Cl.
*B25J 17/00* (2006.01)
*B25J 17/02* (2006.01)
*B25J 18/00* (2006.01)

(52) U.S. Cl.
USPC ..... 74/490.03; 74/490.05; 74/89.2; 74/89.16; 74/89.17; 74/89.11; 74/89.18

(58) Field of Classification Search
USPC .............. 59/96; 74/7, 11, 96, 89, 89.2, 89.11, 74/89.12, 89.16, 89.17, 89.18, 469, 490.03, 74/490.05, 54; 200/341; 267/158, 182; 901/21
See application file for complete search history.

(56) References Cited

U.S. PATENT DOCUMENTS

| | | | |
|---|---|---|---|
| 5,046,375 A | | 9/1991 | Salisbury, Jr. et al. |
| 5,097,105 A | * | 3/1992 | Boin et al. ..................... 219/719 |
| 5,587,937 A | | 12/1996 | Massie et al. |
| 5,907,971 A | * | 6/1999 | Sato et al. ........................ 74/96 |
| 5,931,244 A | * | 8/1999 | Renfroe et al. .............. 180/6.32 |
| 6,183,239 B1 | * | 2/2001 | Belous .......................... 425/564 |
| 6,330,837 B1 | * | 12/2001 | Charles et al. ............. 74/490.06 |
| 6,336,374 B1 | * | 1/2002 | Brogardh et al. .......... 74/490.03 |
| 6,516,681 B1 | * | 2/2003 | Pierrot et al. ............. 74/490.01 |
| 6,985,133 B1 | | 1/2006 | Rodomista et al. |

(Continued)

FOREIGN PATENT DOCUMENTS

| | | |
|---|---|---|
| EP | 1878544 | 1/2008 |
| EP | 2133181 | 12/2009 |
| JP | 2011088262 | 5/2011 |

OTHER PUBLICATIONS

Xu et al., Design of a New Decoupled XYZ Compliant Parallel Micropositioning Stage with Compact Structure, Proceedings of the 2009 IEEE International Conference on Robotics and Biomimetics, Dec. 19-23, 2009, Guilin, China, pp. 901-906.

(Continued)

*Primary Examiner* — Troy Chambers
*Assistant Examiner* — Alexander Vu
(74) *Attorney, Agent, or Firm* — Bell & Manning, LLC

(57) ABSTRACT

An actuating device includes a base link, a first link, a second link, a translating link, a shaft, and a drive. The base link includes a base plate, a first joint, and a second joint. The base plate extends between the first joint and the second joint. The first link is mounted to the first joint to allow rotation of the first link relative to the base plate at the first joint. The second link is mounted to the second joint to allow rotation of the second link relative to the base plate at the second joint. The drive includes an arc surface and is mounted to the translating link such that, when operating the actuating device, a position of the arc surface is fixed relative to the translating plate. The shaft is mounted to the arc surface to cause translation of the translating link as the shaft rotates.

20 Claims, 26 Drawing Sheets

U.S. PATENT DOCUMENTS

| | | | |
|---|---|---|---|
| 7,181,988 B2* | 2/2007 | Nagai et al. | 74/89.22 |
| 7,524,181 B2* | 4/2009 | Chiang | 425/503 |
| 7,673,537 B2* | 3/2010 | Lessard et al. | 74/490.01 |
| 7,735,385 B2* | 6/2010 | Wilson et al. | 74/89.18 |
| 8,307,732 B2 | 11/2012 | Kinoshita et al. | |
| 2002/0029610 A1* | 3/2002 | Chrystall et al. | 73/7 |
| 2003/0235460 A1 | 12/2003 | Moon et al. | |
| 2006/0191364 A1* | 8/2006 | Linke et al. | 74/411 |
| 2007/0113700 A1* | 5/2007 | Khajepour et al. | 74/490.03 |
| 2008/0000317 A1* | 1/2008 | Patton et al. | 74/500.5 |
| 2008/0085176 A1* | 4/2008 | Statkus | 414/462 |
| 2008/0179919 A1* | 7/2008 | Yoshida et al. | 296/202 |
| 2009/0019960 A1* | 1/2009 | Nabat et al. | 74/490.03 |
| 2009/0158674 A1* | 6/2009 | Guerrero et al. | 52/81.2 |
| 2009/0217596 A1* | 9/2009 | Neundorf et al. | 49/506 |
| 2010/0170361 A1 | 7/2010 | Bennett et al. | |
| 2010/0170362 A1 | 7/2010 | Bennett et al. | |
| 2011/0003656 A1 | 1/2011 | Bennett et al. | |
| 2011/0031424 A1* | 2/2011 | Hanlon et al. | 251/129.01 |

OTHER PUBLICATIONS

Bendjedia et al., Sensorless Control of Hybrid Stepper Motor, 2007 European Conference on Power Electronics and Applications, Sep. 2-5, 2007.

Lawrence et al., Low Cost Actuator and Sensor for High-Fidelity Haptic Interfaces, Proceedings of the 12th International Symposium on Haptic Interfaces for Virtual Environment and Teleoperator Systems, 2004, IEEE.

Hoover et al., A Rapidly Prototyped 2-Axis Positioning Stage for Microassembly Using Large Displacement Compliant Mechanisms, International Conference on Robotics and Automation, 2006, IEEE.

Zhang, Towards an Affordable Multi-DOF Force Feedback Motion Control Input Device, A Thesis Submitted in Partial Fulfillment of the Requirements for the Degree of Master of Applied Science in the Faculty of Gradate Studies, The University of British Columbia, Sep. 2000.

International Search Report and Written Opinion issued in PCT/US2012/054724, Feb. 18, 2013.

* cited by examiner

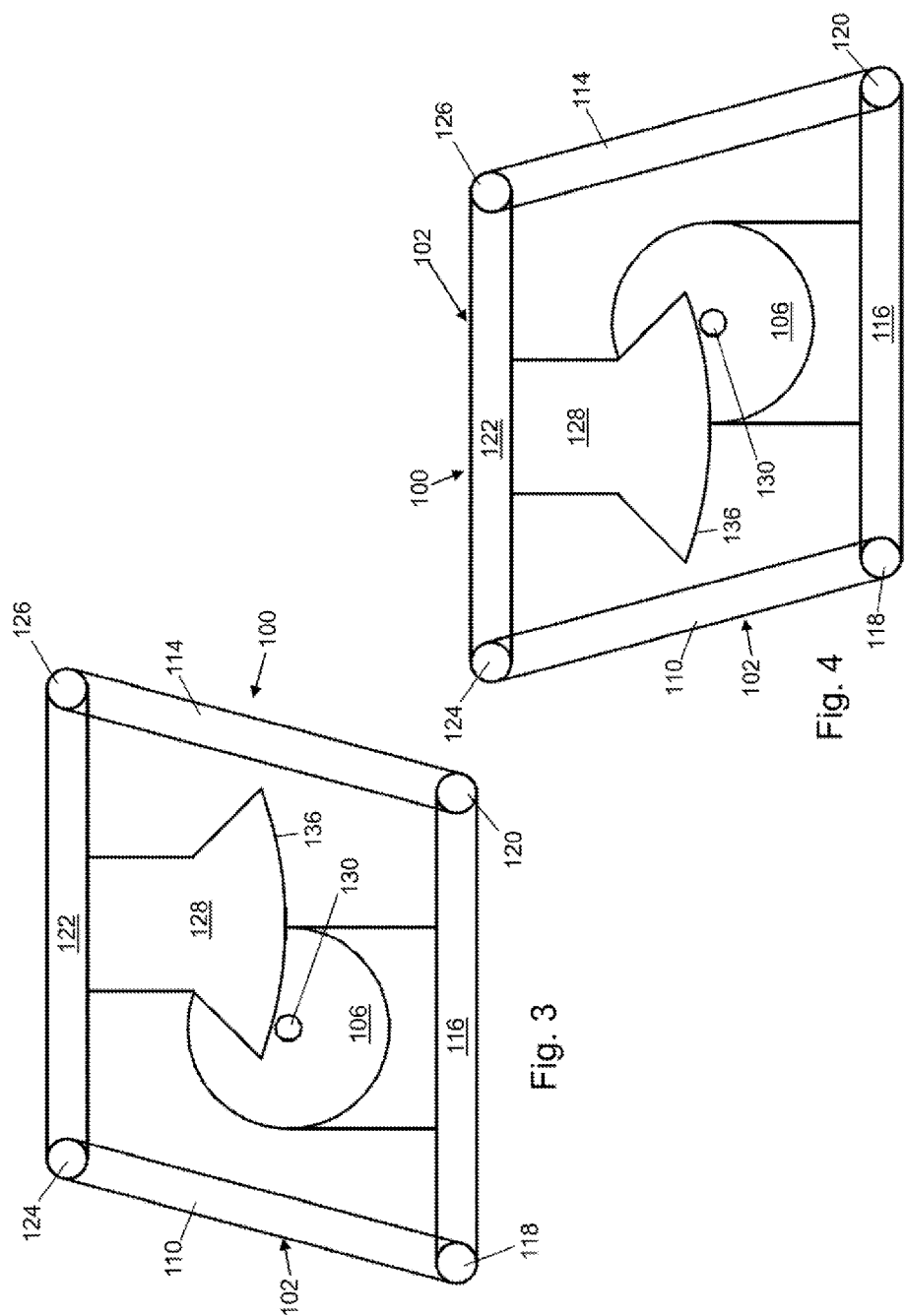

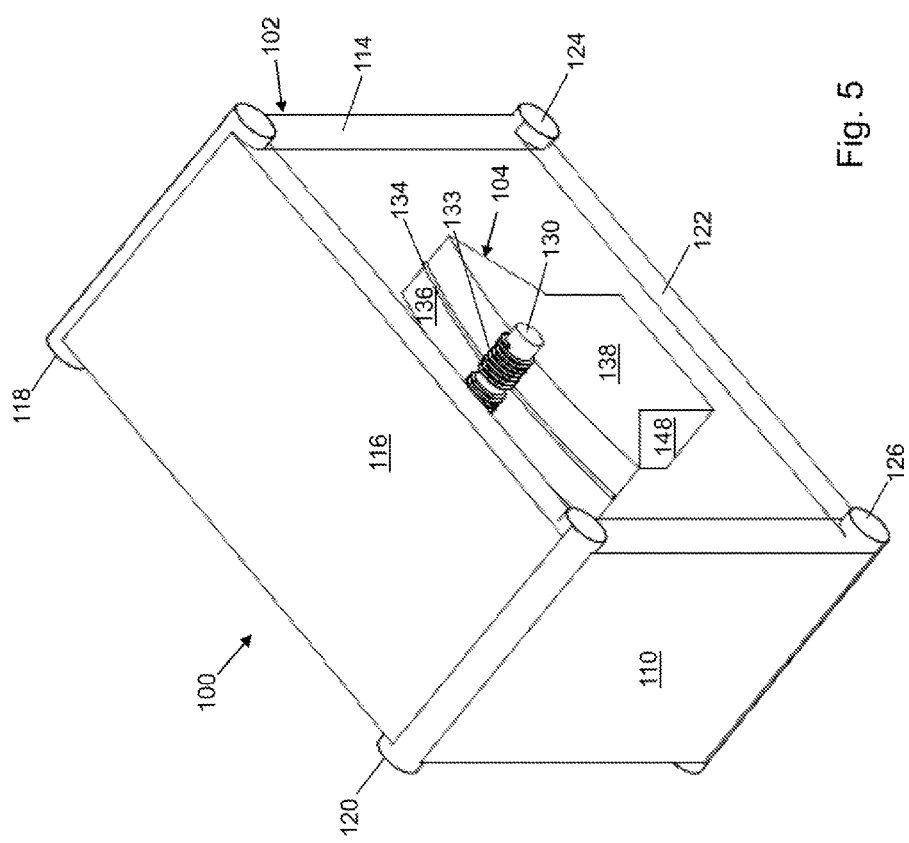

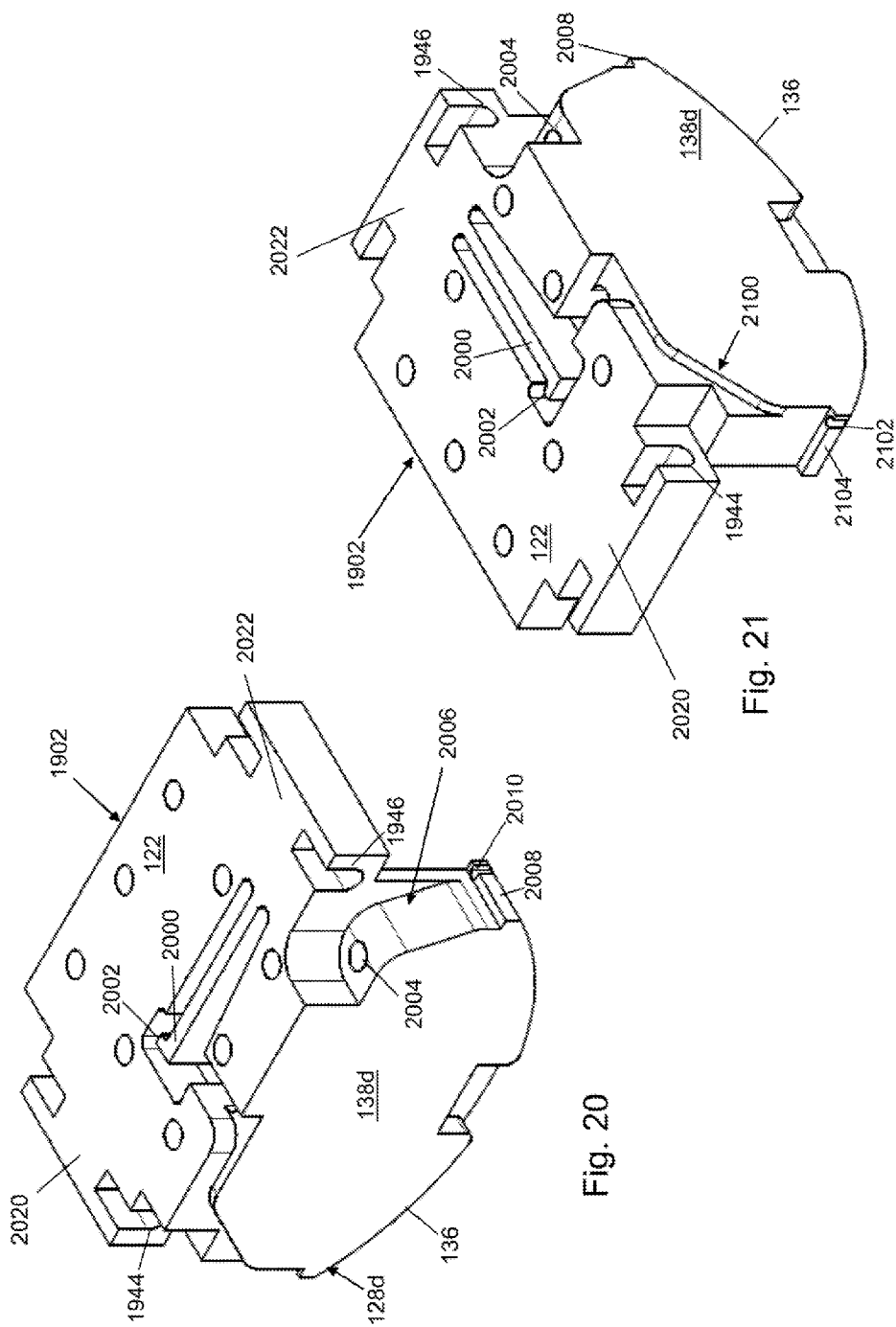

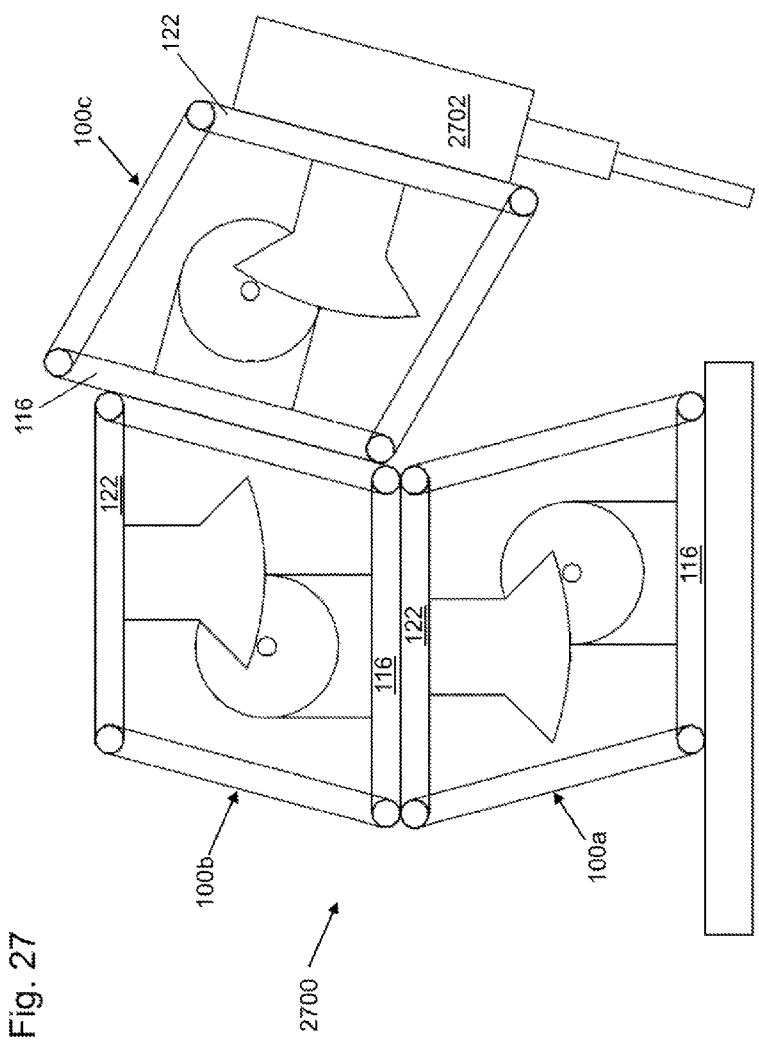

PARALLELOGRAM BASED ACTUATING DEVICE

BACKGROUND

A common application for robotics is to position an object without changing its orientation. In some cases "Cartesian" robots with multiple serial prismatic joints are used. However, prismatic joints present significant design challenges. Unlike revolute joints, which can use compact, precise, and low-cost anti-friction rotational bearings, linear guides are larger, heavier, more expensive, and more difficult to maintain. For example, linear guide surfaces must maintain their surface properties and geometry over the entire length of motion. These surfaces are also susceptible to wear, dirt, and moisture, and are difficult to cover and protect.

In practice, serial-chain robots with revolute joints are more commonly used for these tasks. However, these revolute joint robots require extra joints to keep the object's orientation from changing. For example, to translate an object in two dimensions without changing its orientation, only two prismatic joints are required. For the same task, three revolute joints are required, increasing the cost and complexity of the device.

For precision positioning of objects over small distances, such as micromanipulators, four-bar linkages with leaf-spring flexures are often used instead. When restricted to motion ranges that are small relative to the lengths of the leaf-spring flexure elements, these devices produce near-linear motion. At higher motion ranges, however, the motion deviates significantly from linear, and the leaf-spring forces increase proportionally, making them less effective.

Actuation for these devices is also complicated for larger motion ranges. Typically some form of linear actuator is used to push a drive surface connected to the output portion of the device. At large motion ranges, these linear actuators are no longer aligned with the motion direction, reducing efficiency. The linear actuator tip must also slide along the drive surface an increasingly large amount as the motion range increases, resulting in increased wear, parasitic friction, and side loading of the actuator, none of which is desirable in precision applications.

U.S. Pat. No. 5,587,937 describes a four-bar linkage with cable drive actuation to drive an adjacent link. This configuration has the advantage of keeping the motor bulk and mass on the distal end of the device, but does not allow the bulk and mass to be located in the middle of the linkage, which is preferable for a modular actuator. In addition, this configuration applies forces to one end of the linkage while interaction forces are applied at the opposite end, increasing moment loading and necessitating stiffer bearings and linkages.

SUMMARY

In an example embodiment, an actuating device is provided. The actuating device includes, but is not limited to, a base link, a first link, a second link, a translating link, a shaft, and a drive. The base link includes, but is not limited to, a base plate, a first joint, and a second joint, where the base plate extends between the first joint and the second joint. The first link is mounted to the first joint to allow rotation of the first link relative to the base plate at the first joint. The second link is mounted to the second joint to allow rotation of the second link relative to the base plate at the second joint. The translating link includes, but is not limited to, a translating plate, a third joint, and a fourth joint, where the translating plate extends between the third joint and the fourth joint. The first link is mounted to the third joint to allow rotation of the first link relative to the translating plate at the third joint, and the second link is mounted to the fourth joint to allow rotation of the second link relative to the translating plate at the fourth joint. The shaft is configured to mount to an actuator such that the actuator causes rotation of the shaft. When operating the actuating device, a position of the shaft is fixed relative to the base plate. The drive includes, but is not limited to, an arc surface. The drive is mounted to the translating link such that, when operating the actuating device, a position of the arc surface is fixed relative to the translating plate. The shaft is mounted to the arc surface to cause translation of the translating link as the shaft rotates.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 3 depicts the front schematic diagram of the actuating device of FIG. 1 in a first translated position.

FIG. 4 depicts the front schematic diagram of the actuating device of FIG. 1 in a second translated position.

FIG. 5 depicts a bottom, front, perspective diagram of the actuating device of FIG. 1.

FIG. 20 depicts a right, top, front perspective diagram of a translating part of the actuating device of FIG. 18.

FIG. 21 depicts a left, top, front perspective diagram of the translating part of the actuating device of FIG. 18.

FIG. 27 depicts a front schematic diagram of a plurality of the actuating devices of FIG. 1 arranged to control a position and an orientation of a tool within a plane in accordance with an illustrative embodiment.

DETAILED DESCRIPTION

Figure 1:
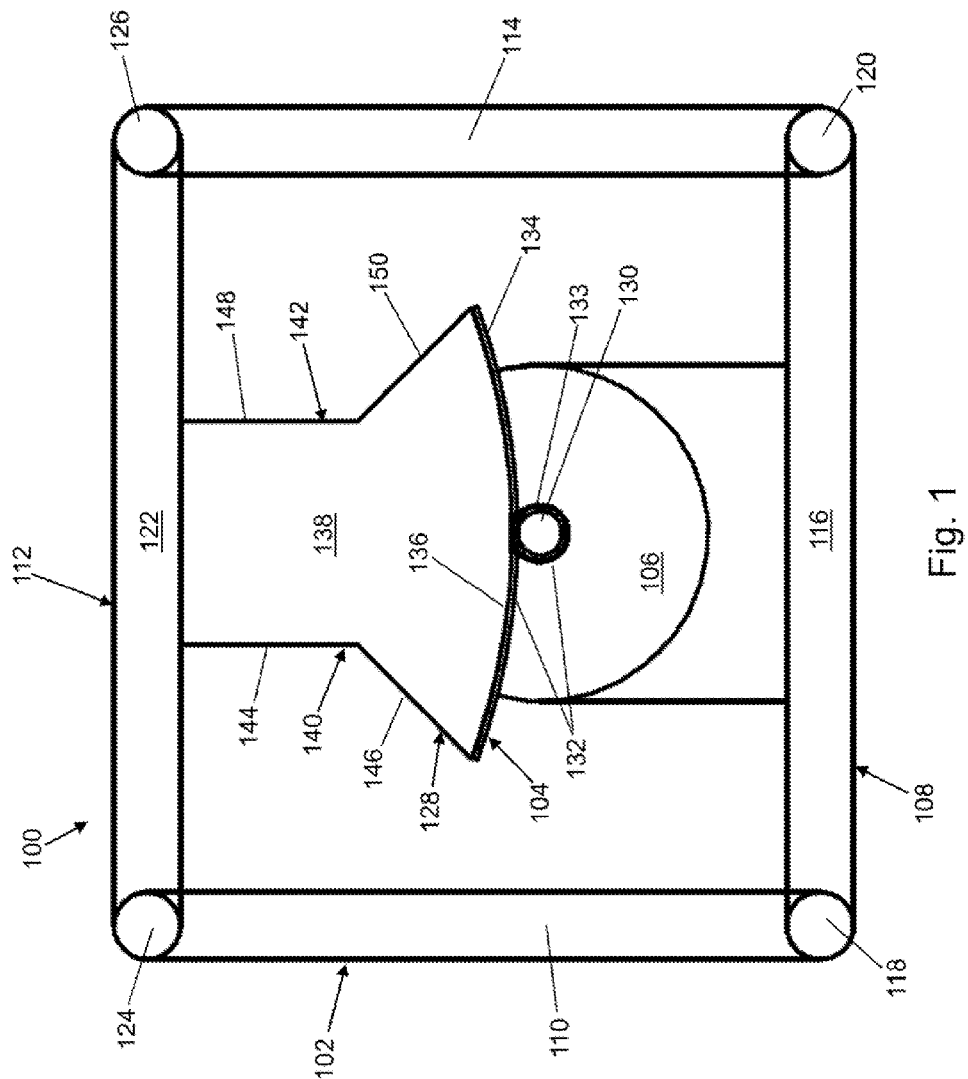
FIG. 1 depicts a front schematic diagram of an actuating device in a center position in accordance with a first illustrative embodiment.

With reference to FIG. 1, a block diagram of an actuating device 100 is shown in accordance with a first illustrative embodiment. In the illustrative embodiment, actuating device 100 includes a 4-bar linkage 102, a drive system 104, and an actuator 106. 4-bar linkage 102 may include a base link 108, a first link 110, a translating link 112, and a second link 114. As used in this disclosure, the term "link" includes any shaped structure used to connect two or more other structures. Actuating device 100 can be mounted to actuate another object in any direction. Thus, the directional references used herein, such as left side, right side, top, bottom, back, front, up, down, etc., are for illustration only based on the orientation in the drawings.

Base link 108 may include a base plate 116 that extends between a first joint 118 and a second joint 120. Base plate 116 may extend directly between first joint 118 and second joint 120 or may be joined to first joint 118 and second joint 120 through intermediate links. Base link 108 may be mounted to another object in any direction. Base link 108, including base plate 116, may include one or more non-flat surfaces and holes of various shapes and sizes, for example, to accommodate various mounting devices and/or to accommodate mounting of actuator 106 adjacent or to base link 108.

As used in this disclosure, the term "joint" includes any type of structure used to join two or more other structures for rotation of one structure relative to the one or more other structures. As examples, first joint 118 and second joint 120 may include hinge joints, ball bearings, bushings, "flex-pivot" joints, "living hinge" plastic flexures, ball and socket joints, etc.

Translating link 112 may include a translating plate 122 that extends between a third joint 124 and a fourth joint 126. Translating plate 122 may extend directly between third joint 124 and fourth joint 126 or may be joined to third joint 124 and fourth joint 126 through intermediate links. Translating link 112 may be mounted to another object in any direction. Translating link 112, including translating plate 122, may include one or more non-flat surfaces and holes of various shapes and sizes, for example, to accommodate various mounting devices. As examples, third joint 124 and fourth joint 126 may include hinge joints, ball bearings, bushings, "flex-pivot" joints, "living hinge" plastic flexures, ball and socket joints, etc.

First link 110 is mounted to first joint 118 to allow rotation of first link 110 relative to base plate 116 at first joint 118. Second link 114 is mounted to second joint 120 to allow rotation of second link 114 relative to base plate 116 at second joint 120. First link 110 is mounted to third joint 124 to allow rotation of first link 110 relative to translating plate 122 at third joint 124. Second link 114 is mounted to fourth joint 126 to allow rotation of second link 114 relative to translating plate 122 at fourth joint 126. As a result, first link 110 and second link 114 constrain motion of translating link 112 such that it translates along an arc and does not rotate relative to base plate 116.

As used in this disclosure, the term "mount" includes join, unite, connect, associate, insert, hang, hold, affix, attach, fasten, bind, paste, secure, bolt, screw, rivet, solder, weld, glue, mold, thermoform, couple, etc. The phrases "mounted on" and "mounted to" include any interior or exterior portion of the support member referenced. Additionally, use of the term "mount" may indicate a direct or an indirect connection between the described components/devices.

In the illustrative embodiment of FIG. 1, drive system 104 may include a drive 128, a shaft 130, and a cable 132. Shaft 130 mounts to actuator 106 such that actuator 106 causes rotation of shaft 130. Shaft 130 is mounted to drive 128, which is mounted to translating link 112 to cause translation of translating link 112 as shaft 130 rotates. As a result, drive system 104 "drives" translation of translating link 112 under control of actuator 106. When operating actuating device 100, a position of shaft 130 is fixed relative to base plate 116.

In the illustrative embodiment of FIG. 1, shaft 130 is mounted to drive 128 by cable 132. Cable 132 may be selected to have a low creep rate, high strength, high fatigue resistance, and high flex resistance. Cable 132 may be formed of a variety of materials that provide the strength and flexibility needed to provide translation of drive 128 based on the size of actuating device 100, the loads to be translated by actuating device 100, the precision with which the loads are to be translated/rotated, etc. as understood by a person of skill in the art. For example, depending on the size of actuating device 100, working environment, storage environment, and lifetime requirements, stainless steel, tungsten, Ultra-High Molecular Weight Polyethylene (UHMwPE) (e.g. Spectra®, Dyneema®), liquid crystal polymer (e.g. Vectran®), or Aramid (e.g. Kevlar®, Twaron®, Technora®), or a composite blend of a high modulus polyethylene material and a liquid crystal polymer may be suitable materials.

Cable 132 may include a shaft cable portion 133 and an arc cable portion 134. Shaft cable portion 133 winds around at least a portion of shaft 130. Arc cable portion 134 extends along at least a portion of an arc surface 136 of drive 128. Cable 132 may be selected to provide a low-friction and low-backlash transmission for drive system 104.

In the illustrative embodiment of FIG. 1, drive 128 may further include a front drive surface 138, a first side surface 140, a second side surface 142, and a back drive surface (not shown). Front drive surface 138, first side surface 140, second side surface 142, and the back drive surface mount to translating plate 122 along first edges. Arc surface 136 forms an arc shaped surface and extends between second edges of front drive surface 138, first side surface 140, second side surface 142, and the back drive surface. Drive 128 may be hollow or solid.

In the illustrative embodiment of FIG. 1, first side surface 140 includes a first attachment side surface 144 and a second attachment side surface 146 that extends at an angle from first attachment side surface 144. First attachment side surface 144 extends in a generally perpendicular direction from translating plate 122 though this is not required. Second side surface 142 includes a third attachment side surface 148 and a fourth attachment side surface 150 that extends at an angle from third attachment side surface 148. Third attachment side surface 148 extends in a generally perpendicular direction from translating plate 122 though this is not required. Second attachment side surface 146 and fourth attachment side surface 150 form a wedge shape from which arc surface 136 is formed. When operating actuating device 100, a position of arc surface 136 is fixed relative to translating plate 122. Front drive surface 138, first side surface 140, second side surface 142, and the back drive surface may have a variety of shapes and sizes and be formed of a variety of materials to provide sufficient strength to translate translating link 112 and the loads to be translated by actuating device 100.

In other illustrative embodiments, shaft 130 may be mounted to drive 128 using friction. For example, shaft 130 may include a first frictional surface and arc surface 136 may include a second frictional surface. Shaft 130 is mounted to arc surface 136 using the frictional force between the first frictional surface and the second frictional surface. As another example, a belt may be mounted to shaft 130 and to drive 128 so that shaft 130 is mounted to rotate arc surface 136 using the belt.

Actuator 106 may include an electric motor such as a brushed or brushless dc motor or an ac motor, a servo motor, a stepper motor, a piezoelectric motor, a pneumatic actuator, a gas motor, an induction motor, a gear motor with an integral or external epicyclical, harmonic, cable, worm or other gear drive, etc. Actuator 106 can be used with or without sensors. A calibration procedure such as that described in Lawrence, D. A. et al, *Low Cost Actuator and Sensor for High-Fidelity Haptic Interfaces*, Haptic Interfaces for Virtual Environment and Teleoperator Systems, International Symposium on, pp. 74-81 (Mar. 27-28, 2004) may also be used to provide a smooth force output suitable for fine manipulation, haptic, and force-control applications when applied to a stepper motor.

Figure 2:
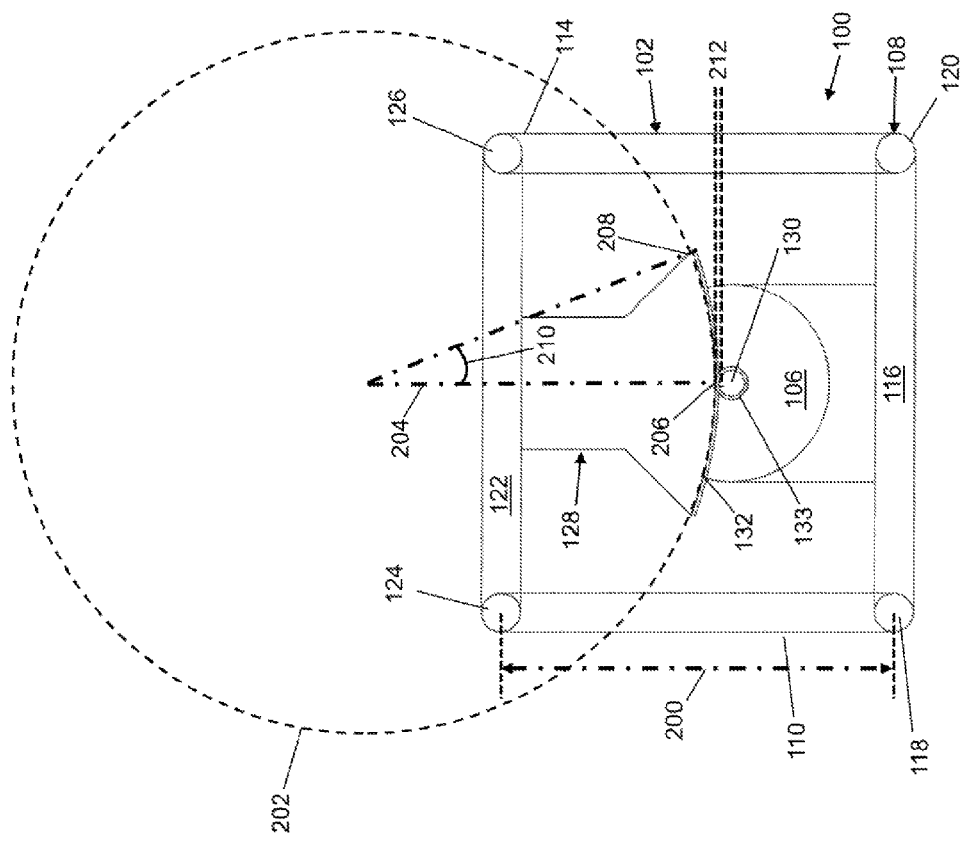
FIG. 2 depicts the front schematic diagram of the actuating device of FIG. 1 including design parameters.

With reference to FIG. 2, design parameters of actuating device 100 are shown. A length 200 of first link 110 and second link 114 is measured perpendicular to base plate 116 and between first joint 118 and third joint 124. Length 200 is approximately equal to $R_1+R_2+G$, where $R_1$ is a radius of shaft 130, $R_2$ is an arc circle radius 204 of an arc circle 202 on which arc surface 136 forms a part of the circumference of arc circle 202, and G, is a cable offset distance 212 between arc surface 136 and a surface of shaft 130 measured parallel to length 200 at an arc surface center 206. Cable offset distance 212 may approximately be a diameter of cable 132 plus a manufacturing tolerance. Thus, length 200 of first link 110 and second link 114 measured between centers of first joint 118 and third joint 124 is approximately equal to a distance measured between a center of shaft 130 and a center of arc circle 202.

Actuator 106 and arc surface 136 are mounted such that a line connecting the center of shaft 130 and the center of arc circle 202 is parallel to length 200 connecting the centers of first joint 118 and third joint 124 to form a centered position of actuating device 100. An arc surface edge 208 defines an arc surface half angle 210 that is a maximum rotation point for drive 128. First link 110 and second link 114 are of approximately equal length, and base plate 116 and translating plate 122 are of approximately equal length.

With reference to FIG. 3, actuating device 100 is shown in a first translated position. Actuator 106 rotates shaft 130 which in turn translated arc surface 136 of drive 128 along an arc. Thus, as shaft 130 rotates, the tangent of arc surface 136 nearest actuator 106 stays aligned with the direction of motion, allowing efficient use of the actuator torque and precision. Rotation of arc surface 136 of drive 128 results in translation of translating plate 122 at third joint 124 and fourth joint 126 while base plate 116 remains fixed. With reference to FIG. 4, actuating device 100 is shown in a second translated position in a direction opposite that of FIG. 3.

While a single actuating device 100 may not produce linear translational motion, a plurality of actuating devices can be combined to provide two- or three-dimensional translational motion. For example, a plurality of actuating devices may be mounted in series and oriented such that each actuating device's nominal translating direction is orthogonal to the others. True motion along a line can then be achieved by coordinated simultaneous motion of multiple actuators.

Figure 6:
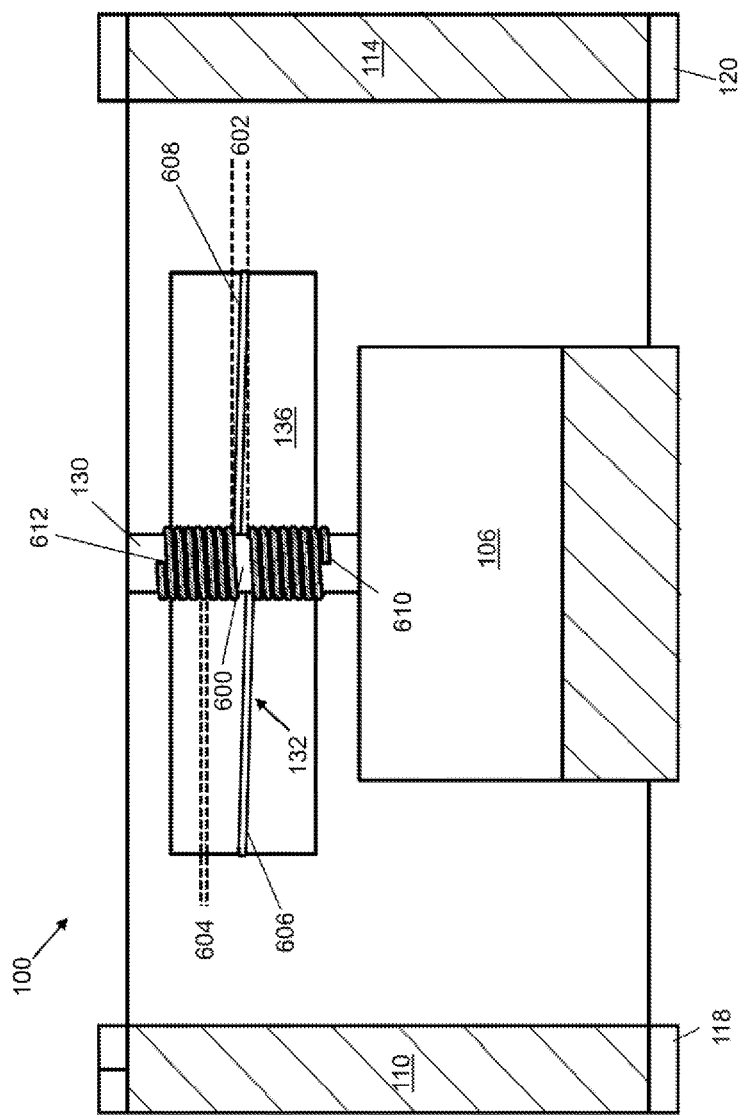
FIG. 6 depicts a bottom schematic cross-section diagram of the actuating device of FIG. 1.

With reference to FIGS. 5 and 6, bottom, front, perspective and bottom schematic diagrams of actuating device 100 are shown to illustrate an example mounting of cable 132. In the illustrative embodiment of FIGS. 5 and 6, cable 132 includes a first cable 606 and a second cable 608. First cable 606 is used for a first drive direction (translation as shown in FIG. 3), and second cable 608 is used for a second drive direction (translation as shown in FIG. 4). First cable 606 has a first end 610 terminated on shaft 130, ensuring that it does not slip. Second cable 608 has a first end 612 terminated on shaft 130, ensuring that it does not slip. The other ends of first cable 606 and second cable 608 are terminated on drive 128 or translating link 112 after extending from shaft 130 along arc surface 136 on opposite sides of shaft 130. Example termination mechanisms include a set screw, adhesive, or threading of cable 132 through a hole in shaft 130 provided for that purpose.

As an example, the illustrative embodiment of FIGS. 5 and 6 is suitable for cases where there is vibration or impact loading of actuating device 100. To minimize loading of the actuator bearings or bushings, cable 132 may be wrapped such that it leaves shaft 130 adjacent to arc surface 136 and not when it is on the opposite side of shaft 130, which would result in a significant upward force on shaft 130 due to the cable preload force and in increasing friction. To prevent bunching and jamming of cable 132 in between arc surface 136 and the surface of shaft 130, notches in extremes of arc surface 136 may be included to help guide cable 132 as it wraps and unwraps on shaft 130. A cable margin 600 is defined between where first cable 606 and second cable 608 mount to shaft 130. A cable offset 602 is the distance between a cable notch and the location where cable 132 leaves shaft 130 so that cable 132 is more likely to wrap and unwrap in a single layer as arc surface 136 moves back and forth, and may be approximately equal to $$\frac{\theta p(R_2+G)}{2\pi(R_1+G)},$$

where θ is arc surface half angle 210 and p is a cable pitch 604 of cable 132 on shaft 130.

Shaft 130 or arc surface 136 may also include spiral grooves to help guide cable 132 as it wraps and unwraps on shaft 130. These grooves have the additional benefit of relieving stress on cable 132 by providing support to the sides of cable 132, preventing cable 132 from flattening against shaft 130 or arc surface 136.

Figure 7:
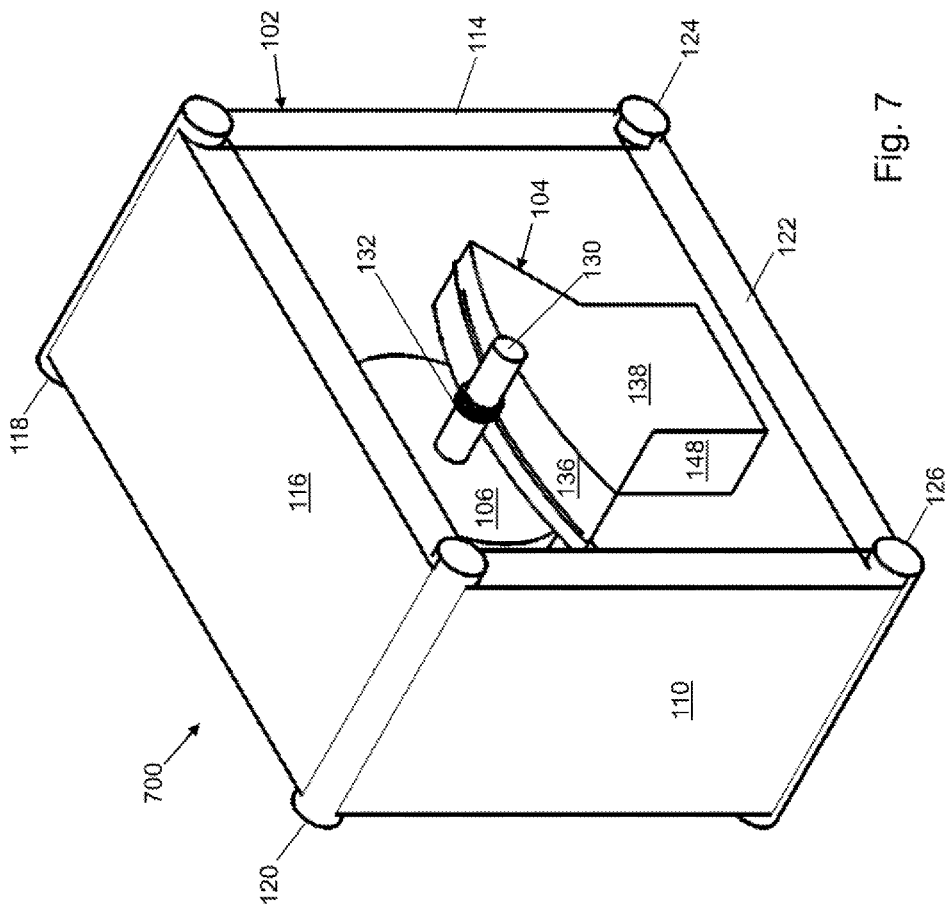
FIG. 7 depicts a bottom, front, perspective diagram of an actuating device in a center position in accordance with a second illustrative embodiment.
Figure 8:
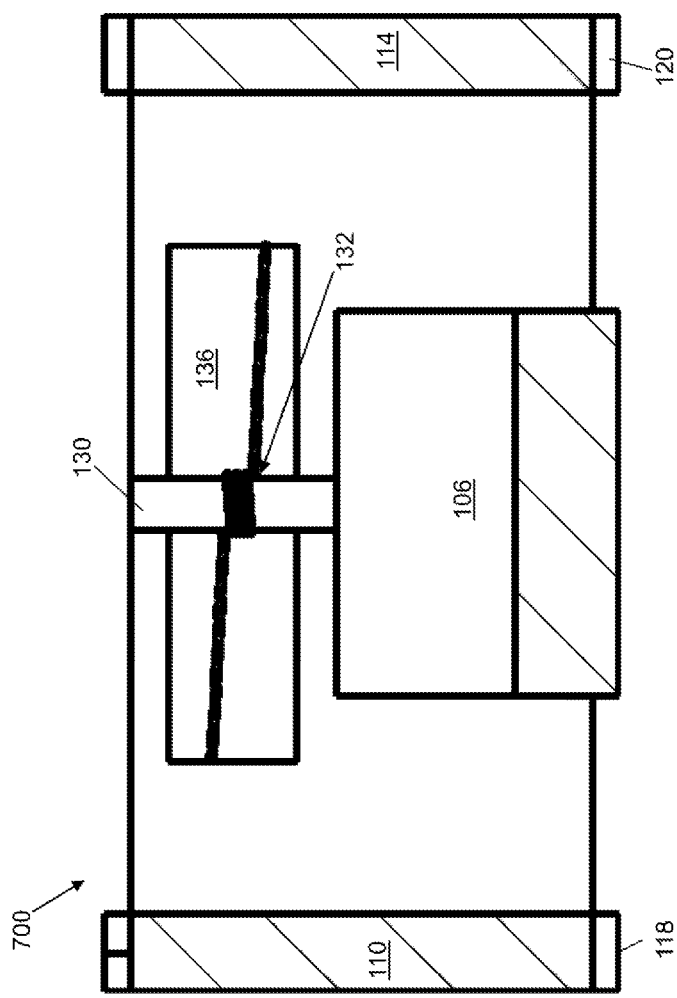
FIG. 8 depicts a bottom schematic cross-section diagram of the actuating device of FIG. 7.

With reference to FIGS. 7 and 8, bottom, front, perspective and bottom schematic diagrams of a second actuating device 700 are shown to illustrate a second example mounting of cable 132. The illustrative embodiment of FIGS. 7 and 8 is suitable for cases where there is minimal vibration or impact loading, or where occasional slippage of cable 132 on shaft 130 may not matter. In this case, cable 132 is comprised of a single cable that is wrapped around shaft 130 for several turns. With enough turns, the friction between cable 132 and shaft 130 is sufficient to prevent slippage. The required number of turns can be determined experimentally for second actuating device 700, or estimated by using the well-known capstan equation and estimates of the cable pre-tension force and coefficient of friction.

Figure 9:
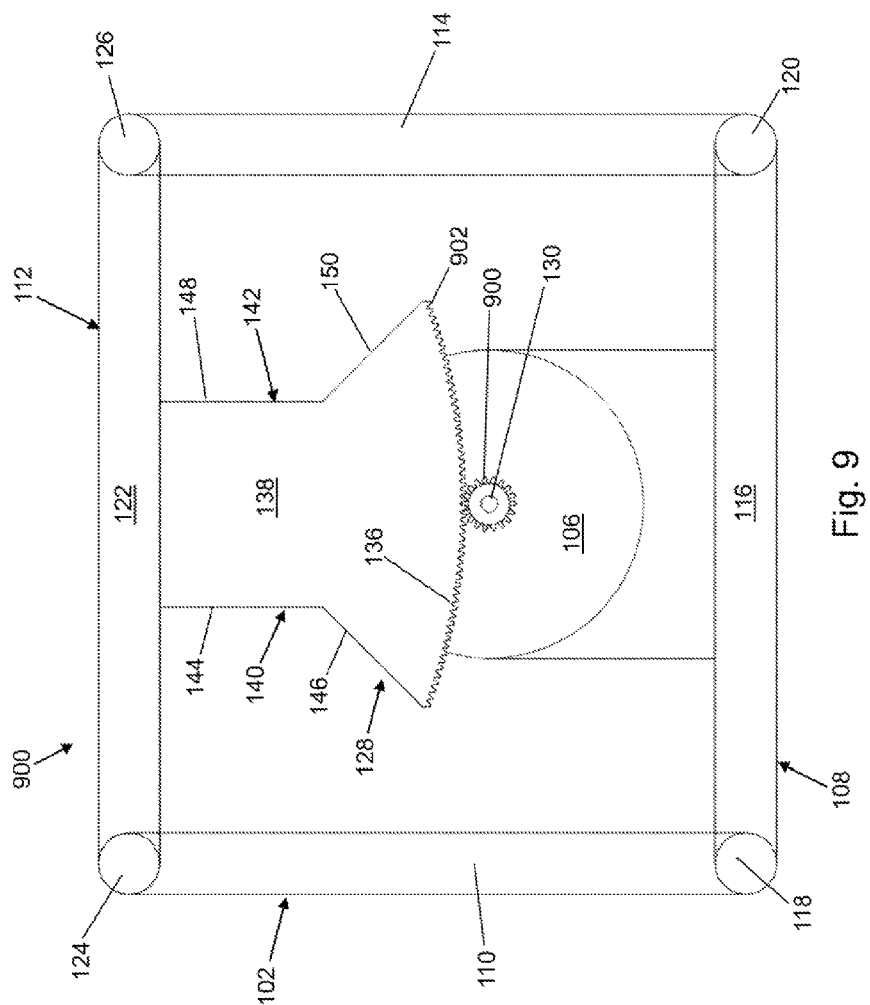
FIG. 9 depicts a front schematic diagram of an actuating device in a center position in accordance with a third illustrative embodiment.

With reference to FIG. 9, a third actuating device 900 is shown to illustrate a third example mounting of shaft 130 to arc surface 136. In the illustrative embodiment of FIG. 9, shaft 130 includes a first plurality of teeth 900 that extend from a surface of shaft 130. Arc surface 136 includes a second plurality of teeth 902 that extend from arc surface 136, wherein the first plurality of teeth 900 mesh with the second plurality of teeth 902 to mount shaft 130 to arc surface 136 and to thereby translate translating link 112 under control of actuator 106.

Figure 10:
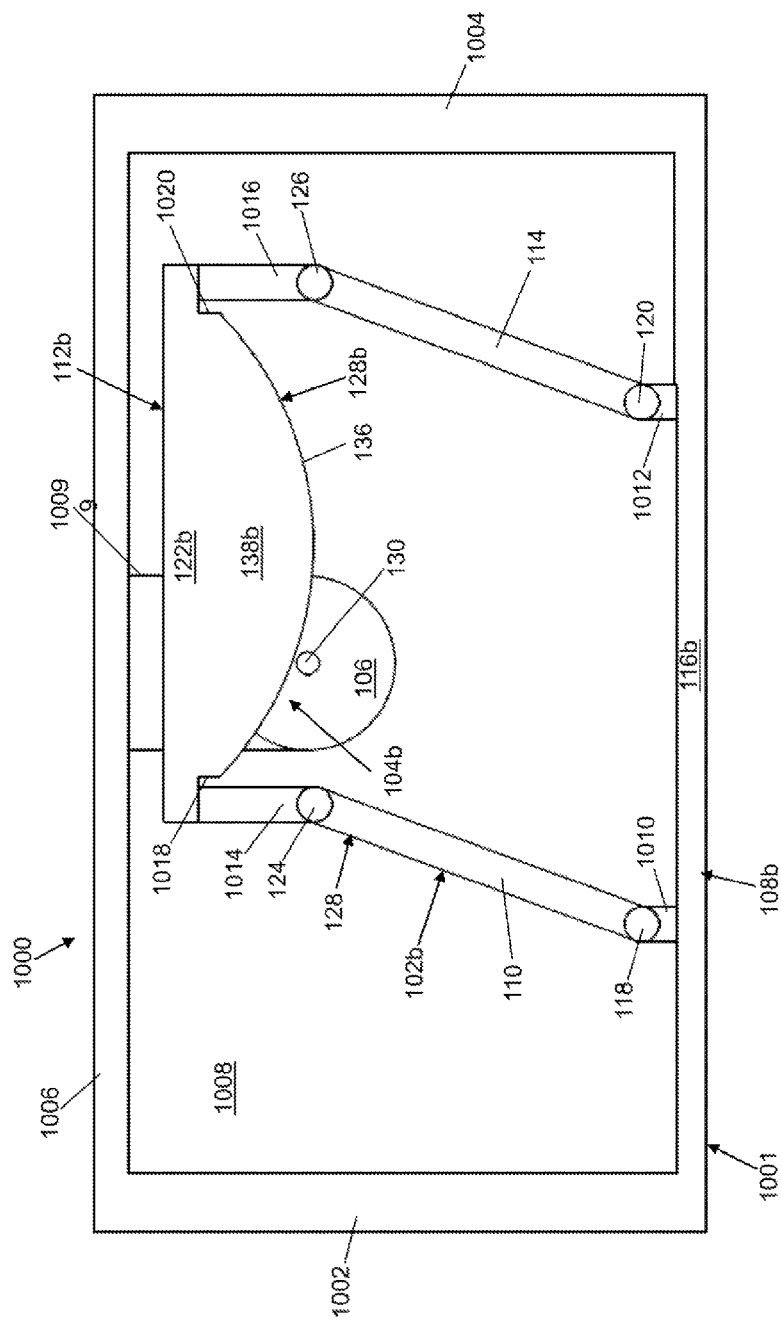
FIG. 10 depicts a front schematic diagram of an actuating device in a translated position in accordance with a fourth illustrative embodiment.

With reference to FIG. 10, a fourth actuating device 1000 is shown in accordance with a fourth illustrative embodiment. Fourth actuating device 1000 may include a housing 1001, a second 4-bar linkage 102b, a second drive system 104b, and actuator 106. Housing 1001 may include a second base link 108b, a first side wall 1002, a second side wall 1004, a top wall 1006, and a back wall 1008. First side wall 1002 extends from a first end of second base link 108b. Second side wall 1004 extends from a second end of second base link 108b opposite the first end of second base link 108b. Top wall 1006 extends between first side wall 1002 and second side wall 1004 above second base link 108b. As used in this disclosure, the term "wall" may include any shaped structure and may be curved. Back wall 1008 includes an actuator support surface 1009 cut in a surface of back wall 1008 to support actuator 106 relative to arc surface 136. Alternatively, actuator support surface 1009 may be attached to top wall 1006 and back wall 1008 may not be required.

Second 4-bar linkage 102b may include second base link 108b, first link 110, a second translating link 112b, and second link 114. Second base link 108b may include a second base plate 116b that extends between first joint 118 and second joint 120. First joint 118 mounts to second base link 108b through a first joint support 1010 that extends up from second base link 108b. Second joint 120 mounts to second base link 108b through a second joint support 1012 that extends up from second base link 108b.

Second translating link 112b may include a second translating plate 122b that extends between third joint 124 and fourth joint 126. Third joint 124 mounts to second translating plate 122b through a first joint connector 1014 that extends up from third joint 124. Fourth joint 126 mounts to second translating plate 122b through a second joint connector 1016 that extends up from fourth joint 126.

In the illustrative embodiment of FIG. 10, second drive system 104b may include a second drive 128b, shaft 130, and any of the mechanisms for mounting arc surface 136 to shaft 130 discussed herein. Second drive 128b may include arc surface 136, a second front drive surface 138b, a fifth attachment side surface 1018, a sixth attachment side surface 1020, and a back drive surface (not shown). Second front drive surface 138b, fifth attachment side surface 1018, sixth attachment side surface 1020, and the back drive surface mount to second translating plate 122b along first edges. Arc surface 136 forms an arc shaped surface and extends between second edges of front drive surface 138b, fifth attachment side surface 1018, sixth attachment side surface 1020, and the back drive surface. Drive 128b may be hollow or solid. In the illustrative embodiment of FIG. 10, fifth attachment side surface 1018 and sixth attachment side surface 1020 extend generally perpendicular from second translating plate 122b.

Figure 11:
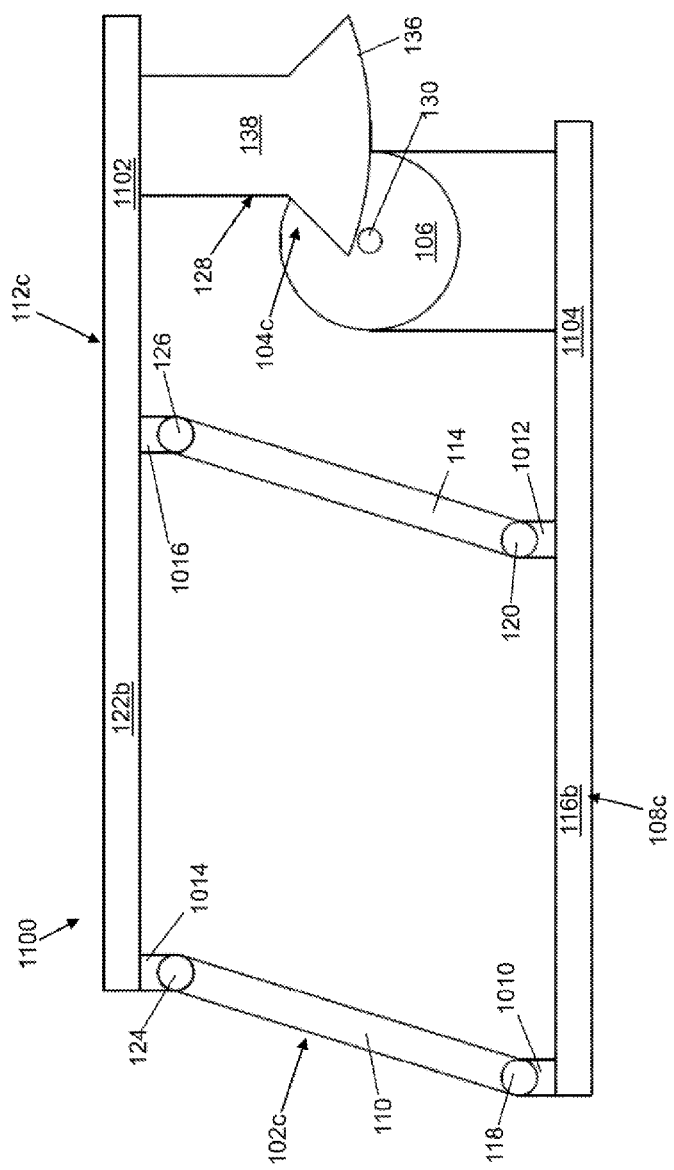
FIG. 11 depicts a front schematic diagram of an actuating device in a translated position in accordance with a fifth illustrative embodiment.

With reference to FIG. 11, a fifth actuating device 1100 is shown in accordance with a fifth illustrative embodiment. Fifth actuating device 1100 may include a third 4-bar linkage 102c, a third drive system 104c, and actuator 106. Third 4-bar linkage 102c may include a third base link 108c, first link 110, a third translating link 112c, and second link 114. Third base link 108c may include second base plate 116b that extends between first joint 118 and second joint 120. First joint 118 mounts to third base link 108c through first joint support 1010 that extends up from third base link 108c. Second joint 120 mounts to third base link 108c through second joint support 1012 that extends up from third base link 108c. Third base link 108c further may include a base extension plate 1104 that extends from second base plate 116b at second joint support 1012 and is generally parallel to second base plate 116b. Actuator 106 is mounted adjacent or to base extension plate 1104.

Third translating link 112c may include second translating plate 122b that extends between third joint 124 and fourth joint 126. Third joint 124 mounts to second translating plate 122b through first joint connector 1014 that extends up from third joint 124. Fourth joint 126 mounts to second translating plate 122b through second joint connector 1016 that extends up from fourth joint 126. Third translating link 112c further may include an extension plate 1102 that extends from second translating plate 122b at second joint connector 1016 and is generally parallel to second translating plate 122b. Drive 128 mounts to extension plate 1102 in a direction towards shaft 130. In the illustrative embodiment of FIG. 11, third drive system 104c may include drive 128, shaft 130, and any of the mechanisms for mounting arc surface 136 to shaft 130 discussed herein.

Figure 12:
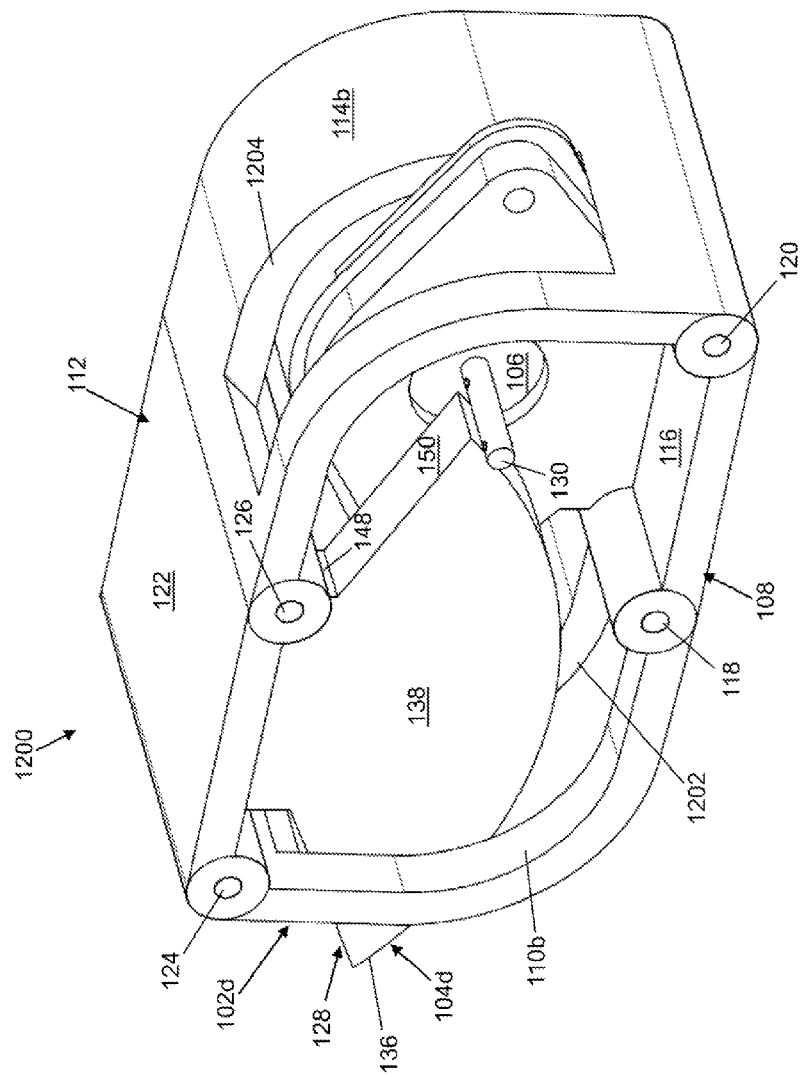
FIG. 12 depicts a side, front perspective diagram of an actuating device in a first translated position in accordance with a sixth illustrative embodiment.

With reference to FIG. 12, a sixth actuating device 1200 is shown in accordance with a sixth illustrative embodiment in a first translated position. Sixth actuating device 1200 may include a fourth 4-bar linkage 102d, a fourth drive system 104d, and actuator 106. Fourth 4-bar linkage 102d may include base link 108, a first curved link 110b, translating link 112, and a second curved link 114b. First curved link 110b forms a curved surface between first joint 118 and third joint 124. First curved link 110b further includes a first slot 1202 that allows drive 128 and/or a body of actuator 106 to extend through first curved link 110b. Second curved link 114b forms a curved surface between second joint 120 and fourth joint 126. Second curved link 114b further includes a second slot 1204 that allows drive 128 and/or the body of actuator 106 to extend through second curved link 114b. First curved link 110b and second curved link 114b have the same curvature though mounted to curve in opposite directions as more clearly shown in FIG. 13. First curved link 110b and second curved link 114b may be curved to avoid collisions with the body of actuator 106, drive 128, and/or actuator mounting flanges. In the illustrative embodiment of FIG. 12, fourth drive system 104d may include drive 128, shaft 130, and any of the mechanisms for mounting arc surface 136 to shaft 130 discussed herein.

Figure 13:
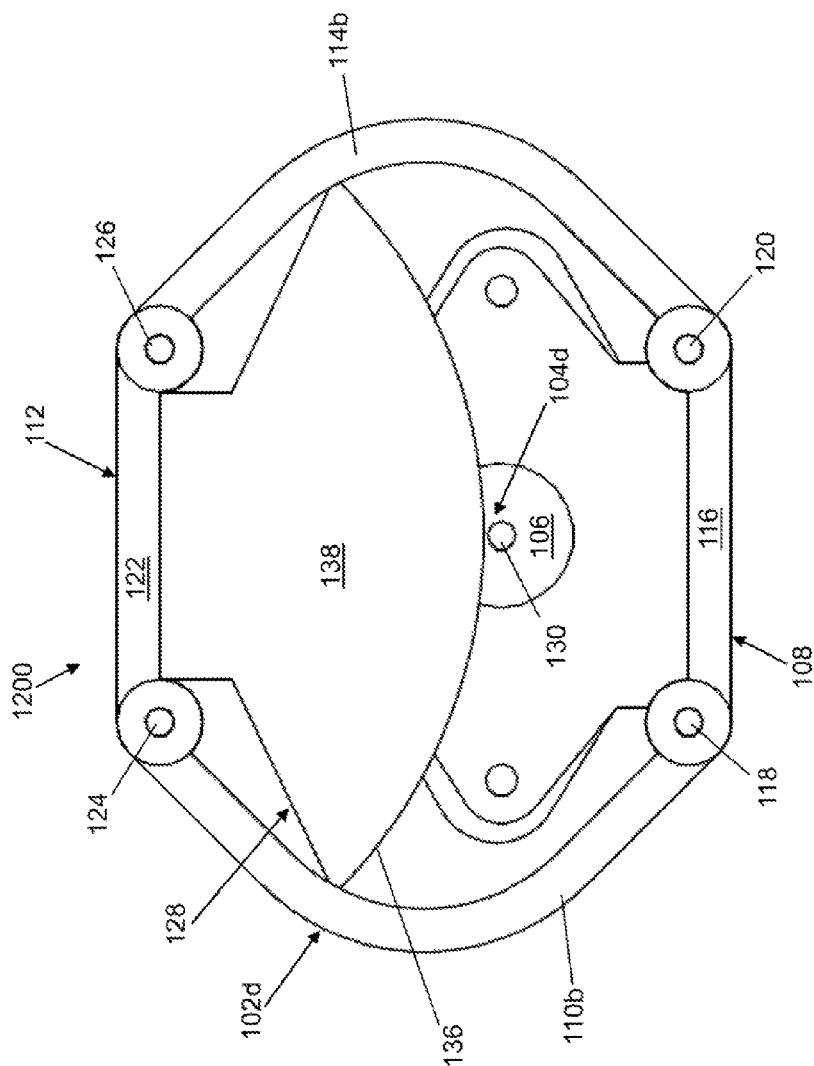
FIG. 13 depicts a front schematic diagram of the actuating device of FIG. 12 in a center position.
Figure 14:
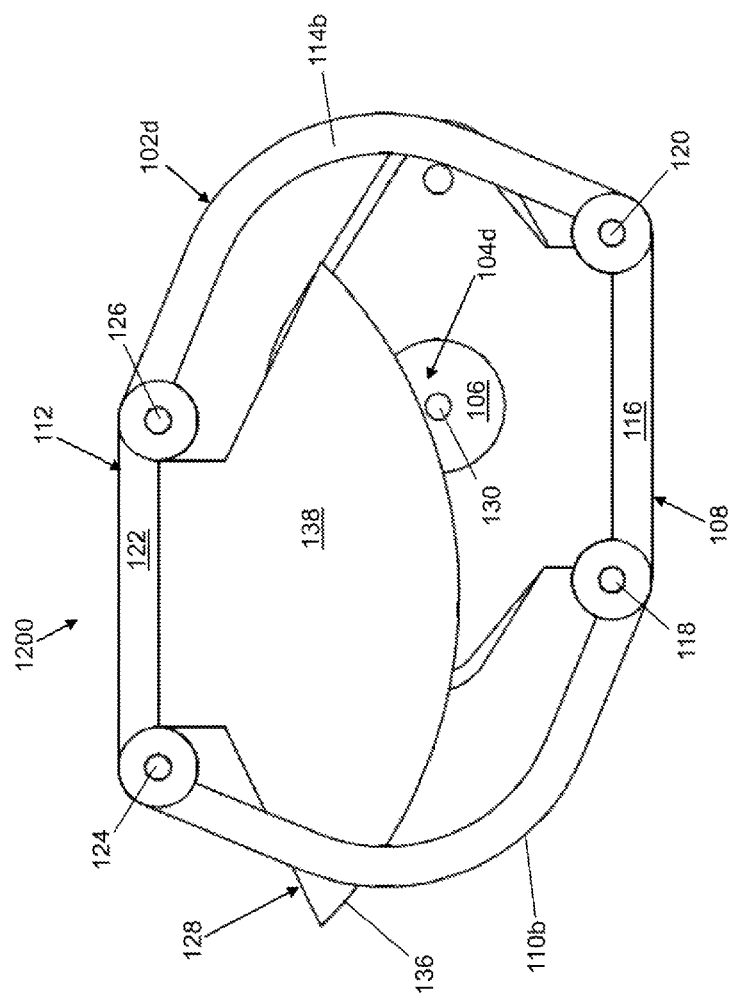
FIG. 14 depicts a front schematic diagram of the actuating device of FIG. 12 in a second translated position.
Figure 15:
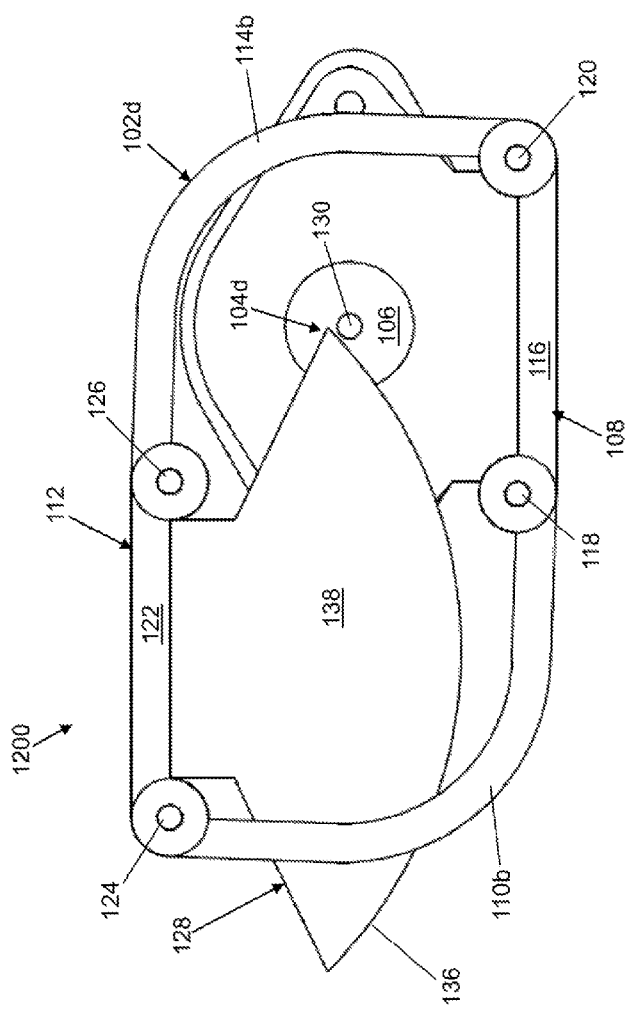
FIG. 15 depicts a front schematic diagram of the actuating device of FIG. 12 in the first translated position.

With reference to FIG. 13, a front schematic view of sixth actuating device 1200 is shown in a center position. With reference to FIG. 14, a front schematic view of sixth actuating device 1200 is shown in a second translated position relative to that of FIG. 12. With reference to FIG. 15, a front schematic view of sixth actuating device 1200 is shown in the first translated position of FIG. 12.

Figure 16:
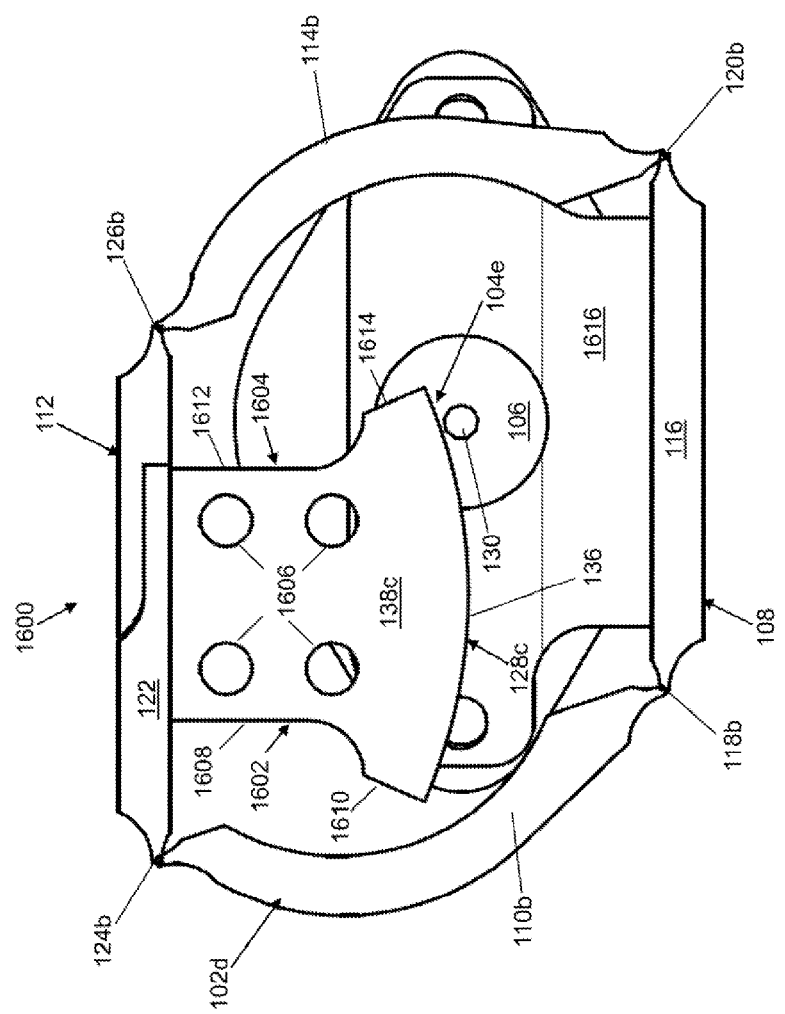
FIG. 16 depicts a front schematic diagram of an actuating device in a translated position in accordance with a sixth illustrative embodiment.
Figure 17A:
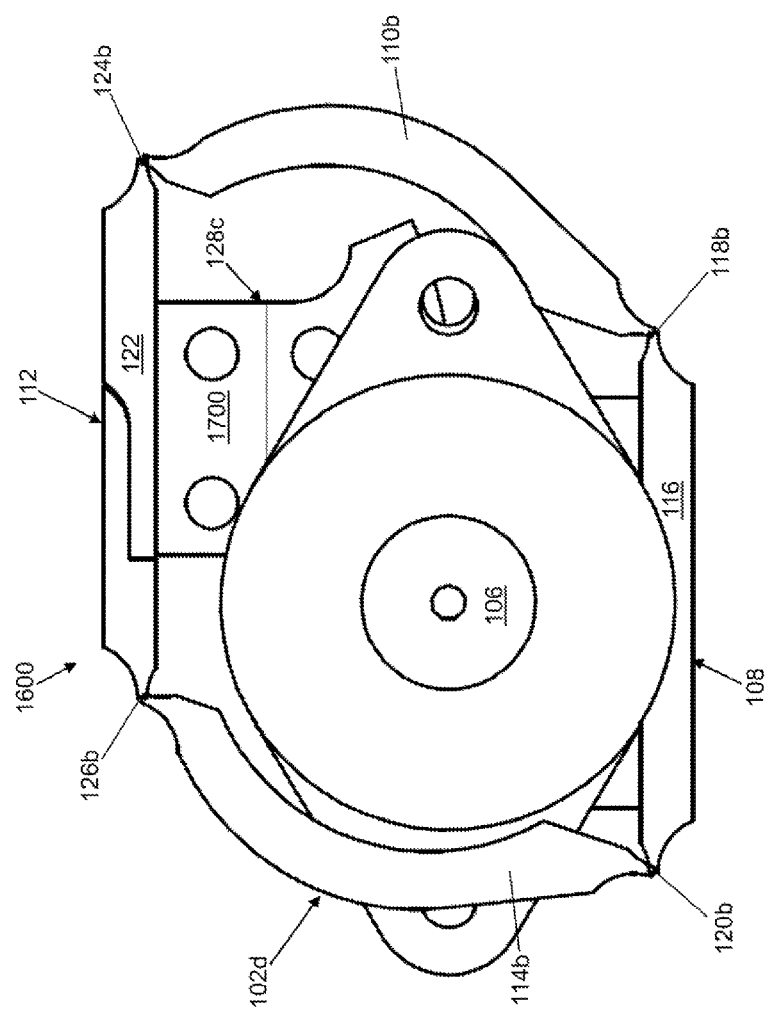
FIG. 17a depicts a back schematic diagram of the actuating device of FIG. 16 in the translated position.
Figure 17B:
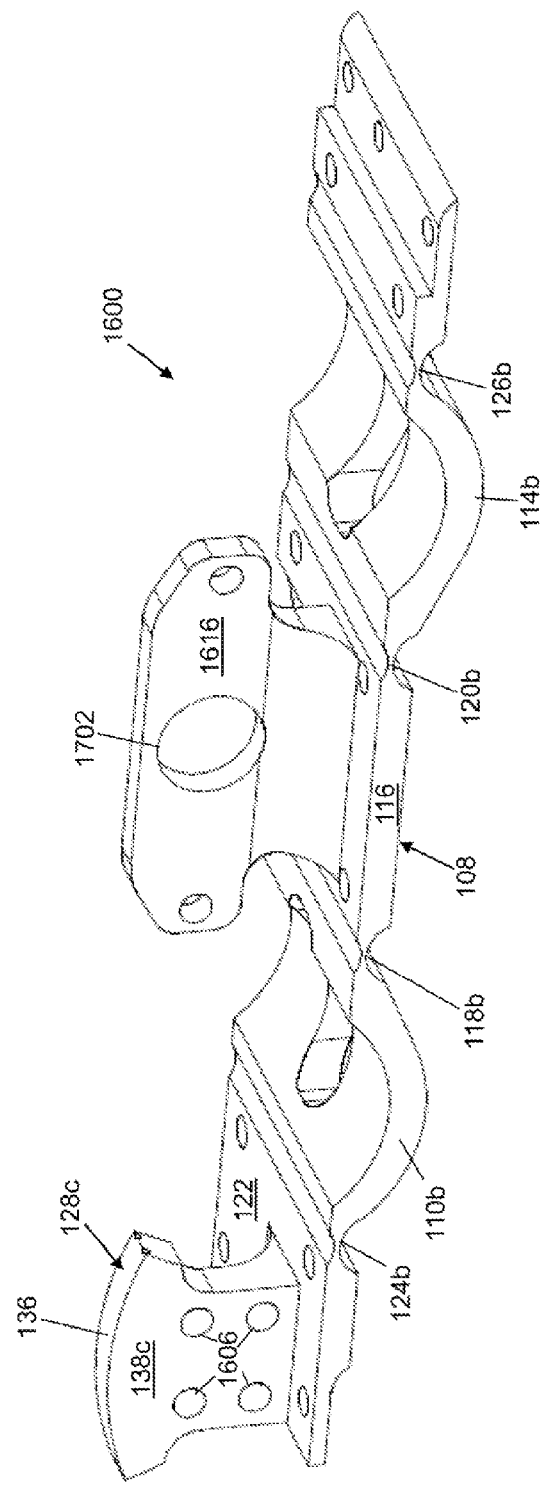
FIG. 17b depicts a disconnected schematic diagram of the actuating device of FIG. 16.

With reference to FIG. 16, a seventh actuating device 1600 is shown in accordance with a seventh illustrative embodiment and in a first translated position. With reference to FIG. 17a, a back schematic view of seventh actuating device 1600 is shown in a first translated position. With reference to FIG. 17b, a disconnected schematic diagram of seventh actuating device 1600 is shown. Seventh actuating device 1600 may include fourth 4-bar linkage 102d, a fifth drive system 104e, and actuator 106. Fourth 4-bar linkage 102d may include base link 108, first curved link 110b, translating link 112, and second curved link 114b. First curved link 110b forms a curved surface between first flexure joint 118b and third flexure joint 124b. Second curved link 114b forms a curved surface between second flexure joint 120b and fourth flexure joint 126b. In the illustrative embodiment of FIG. 16, fifth drive system 104e may include a third drive 128c, shaft 130, and any of the mechanisms for mounting arc surface 136 to shaft 130 discussed herein.

Third drive 128c may include arc surface 136, a third front drive surface 138c, a third side surface 1602, a fourth side surface 1604, and a back drive surface 1700 (shown with reference to FIG. 17a). Third front drive surface 138c, third side surface 1602, fourth side surface 1604, and back drive surface 1700 mount to second translating plate 122b along first edges. Arc surface 136 forms an arc shaped surface and extends between second edges of third front drive surface 138c, third side surface 1602, fourth side surface 1604, and back drive surface 1700. Third drive 128c may be hollow or solid. In the illustrative embodiment of FIG. 16, third front drive surface 138c includes a plurality of holes 1606 used to terminate cable 132. An actuator support wall 1616 extends up from base plate 116 and support actuator 106 and includes a second actuator support surface 1702 (shown with reference to FIG. 17b).

In the illustrative embodiment of FIG. 16, third side surface 1602 includes a seventh attachment side surface 1608 and an eighth attachment side surface 1610 that extends at an arc from seventh attachment side surface 1608. Seventh attachment side surface 1608 extends in a generally perpendicular direction from translating plate 122. Fourth side surface 1604 includes a ninth attachment side surface 1612 and a tenth attachment side surface 1614 that extend at an arc from ninth attachment side surface 1612. Ninth attachment side surface 1612 extends in a generally perpendicular direction from translating plate 122. Eighth attachment side surface 1610 and tenth attachment side surface 1614 form a wedge shape from which arc surface 136 is formed.

Figure 18:
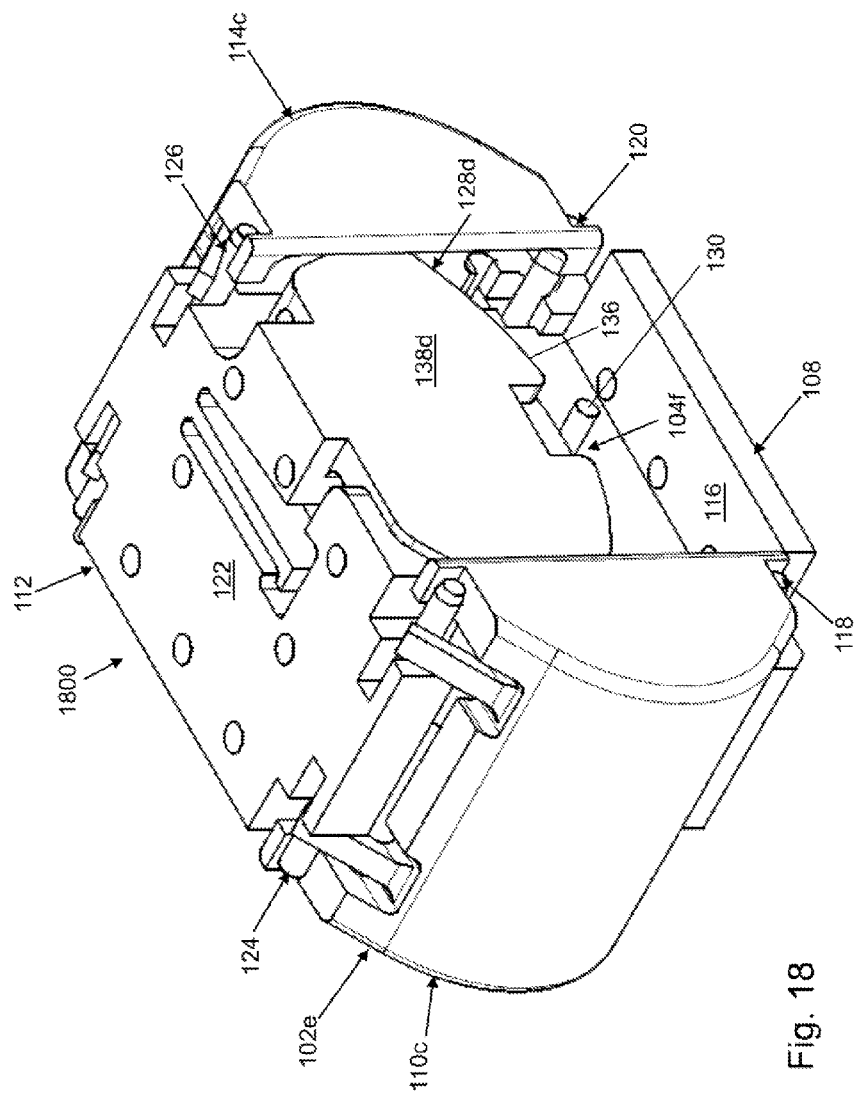
FIG. 18 depicts a side, front perspective diagram of an actuating device in a center position in accordance with a seventh illustrative embodiment.

With reference to FIG. 18, a front, left perspective diagram of an eighth actuating device 1800 is shown in accordance with an eighth illustrative embodiment. Eighth actuating device 1800 may include a fifth 4-bar linkage 102e, a sixth drive system 104f, and actuator 106.

Figure 19:
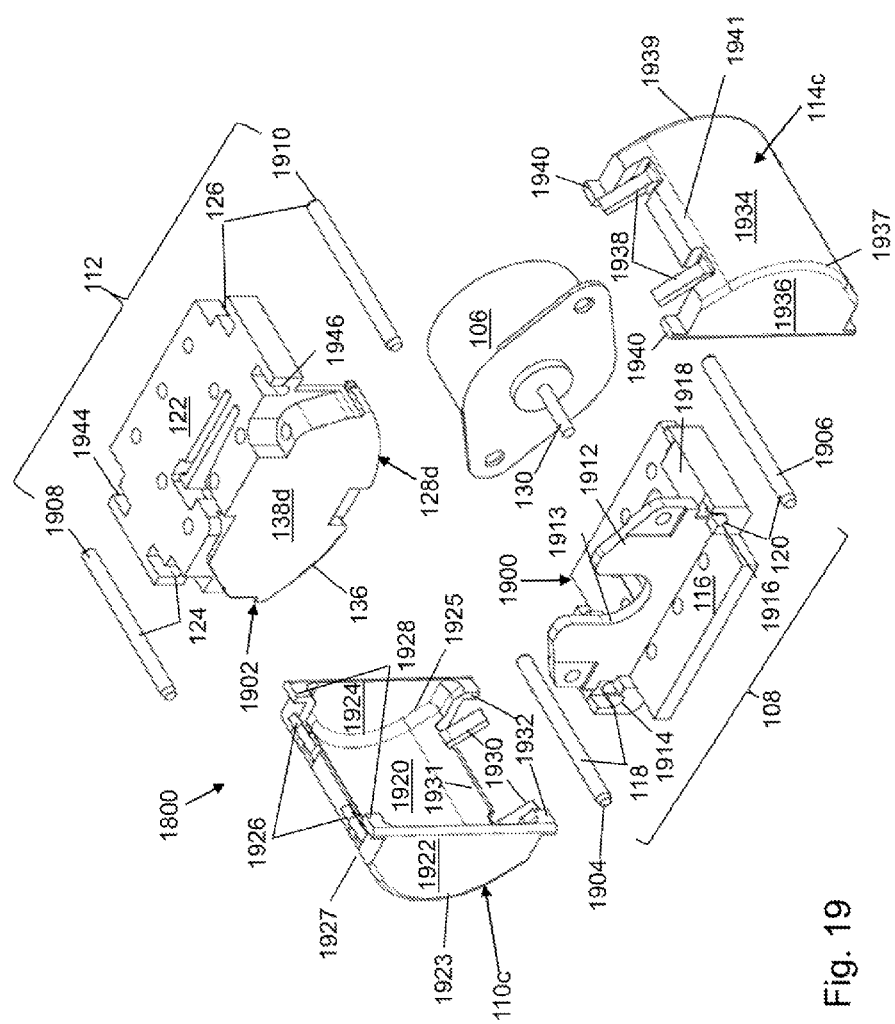
FIG. 19 depicts an exploded diagram of the actuating device of FIG. 18.

With reference to FIG. 19, which shows an exploded view of eighth actuating device 1800, eighth actuating device 1800 may include a base part 1900, a third curved link 110c, a translating part 1902, a fourth curved link 114c, actuator 106, a first shaft 1904, a second shaft 1906, a third shaft 1908, and a fourth shaft 1910. Fifth 4-bar linkage 102e may include base link 108, third curved link 110c, translating link 112, and fourth curved link 114c.

Base part 1900 may include base plate 116, actuator support wall 1912, a first arc shaped socket 1914, a first socket ceiling 2400 (shown with reference to FIG. 24), a second arc shaped socket 1916, and a second socket ceiling 1918. Base link 108 may include base plate 116 that extends between first joint 118 and second joint 120. Base plate 116 is mounted between first joint 118 and second joint 120. First joint 118 may include first shaft 1904, first arc shaped socket 1914, and first socket ceiling 2400. First arc shaped socket 1914 is sized and shaped to hold one end of first shaft 1904. First socket ceiling 2400 is mounted over the middle portion of first shaft 1904 to further hold first shaft 1904 in position. The vertical offset between first arc shaped socket 1914 and first socket ceiling 2400 should be slightly less than the diameter of shaft 1904 to provide a press-fit and prevent shaft 1904 from moving relative to base part 1900. Second joint 120 may include second shaft 1906, second arc shaped socket 1916, and second socket ceiling 1918. Second arc shaped socket 1916 is sized and shaped to hold second shaft 1906. Second socket ceiling 1918 is mounted to extend over at least a portion of second arc shaped socket 1916 to further hold second shaft 1906 in position.

Actuator support wall 1912 is mounted to extend up from base plate 116 in a generally perpendicular direction. Actuator support wall 1912 includes a second actuator support surface 1913 sized and shaped to support actuator 106 relative to arc surface 136 when mounted together to form eighth actuating device 1800. In the illustrative embodiment of FIGS. 18 and 19, actuator support wall 1912 further includes mounting pin holes that align with actuator mounting pin holes to fixedly mount actuator 106 to actuator support wall 1912 which is fixedly mounted to base plate 116. The mounting pin holes may accommodate pins or screws or the like.

Third curved link 110c forms a curved surface between first joint 118 and third joint 124 and mounts to base plate 116 at first joint 118 and to translating plate 122 at third joint 124. Fourth curved link 114c forms a curved surface between second joint 120 and fourth joint 126. Third curved link 110c and fourth curved link 114c have the same curvature though mounted to curve in opposite directions. First curved link 110b and second curved link 114b may be curved to avoid collisions with sixth drive system 104f while minimizing the overall size of the assembled device.

In the illustrative embodiment of FIGS. 18 and 19, third curved link 110c includes a first curved wall 1920, a third side wall 1922, a fourth side wall 1924, a first pair of retainer clips 1926, a first pair of abutment walls 1928, a second pair of retainer clips 1930, and a second pair of abutment walls 1932. Third side wall 1922 is mounted to extend from first curved wall 1920 along a first edge 1923. Fourth side wall 1924 is mounted to extend from first curved wall 1920 along a second edge 1925 generally opposite first edge 1923. The first pair of retainer clips 1926 extend from a third edge 1927 of first curved wall 1920. A first abutment wall of the first pair of abutment walls 1928 extends from third side wall 1922, and a second abutment wall of the first pair of abutment walls 1928 extends from fourth side wall 1924. The second pair of retainer clips 1930 extend from a fourth edge 1931 of first curved wall 1920. A first abutment wall of the second pair of abutment walls 1932 extends from third side wall 1922, and a second abutment wall of the second pair of abutment walls 1932 extends from fourth side wall 1924. Third shaft 1908 fits within a space defined by the first pair of retainer clips 1926 and the first pair of abutment walls 1928. First shaft 1904 fits within a space defined by the second pair of retainer clips 1930 and the second pair of abutment walls 1932.

In the illustrative embodiment of FIGS. 18 and 19, fourth curved link 114c includes a second curved wall 1934, a fifth side wall 1936, a sixth side wall (not shown), a third pair of retainer clips 1938, a third pair of abutment walls 1940, a fourth pair of retainer clips (not shown), and a fourth pair of abutment walls (not shown). Fifth side wall 1936 is mounted to extend from second curved wall 1934 along a first edge 1937. The sixth side wall is mounted to extend from second curved wall 1934 along a second edge 1939 generally opposite first edge 1937. The third pair of retainer clips 1938 extend from a third edge 1941 of second curved wall 1934. A first abutment wall of the third pair of abutment walls 1940 extends from fifth side wall 1936, and a second abutment wall of the third pair of abutment walls 1940 extends from the sixth side wall. The fourth pair of retainer clips extends from a fourth edge (not shown) of second curved wall 1934. A first abutment wall of the fourth pair of abutment walls extends from third side wall 1936, and a second abutment wall of the fourth pair of abutment walls extends from the sixth side wall. Fourth shaft 1910 fits within a space defined by the third pair of retainer clips 1938 and the third pair of abutment walls 1940. Second shaft 1906 fits within a space defined by the fourth pair of retainer clips and the fourth pair of abutment walls.

The retainer clips 1926, 1930, 1938 may be designed to provide a pre-load force large enough to withstand any expected interaction forces without exceeding the yield strength of the material. For example, retainer clips 1926, 1930, 1938 may be pre-loaded in two directions, a first direction is against shaft 130 to prevent motion perpendicular to shaft 130, and a second direction is against an outer wall of the socket ceiling to prevent motion along the axis of shaft 130. In addition, to minimize parasitic frictional forces, the pre-load forces may not be much larger than required for withstanding these interaction forces. A lubricant can be added to the retainer clips 1926, 1930, 1938 or shafts 1904, 1906, 1908, 1910 to reduce friction, or an additive, such as perfluoropolyether (PFPE) synthetic oil, PTFE (Polytetrafluoroethylene), silicone, molybdenum disulfide, or graphite, can be used during a molding process to provide internal lubrication. Alternatively, the pairs of abutment walls 1928, 1932, 1940 and retainer clips 1926, 1930, 1938 can be replaced with simple precision holes with a slip-fit tolerance relative to the shafts 1904, 1906, 1908, 1910. In this case, an additional manufacturing step or tightly controlled injection molding process may be used to make the hole, and a small amount of backlash may result, though the joint should be able to withstand a greater range of interaction forces.

In the illustrative embodiment of FIGS. 18 and 19, sixth drive system 104f may include a fourth drive 128d, shaft 130, and any of the mechanisms for mounting arc surface 136 to shaft 130 discussed herein. Translating part 1902 may include translating plate 122, fourth drive 128d, a third arc shaped socket 1944, a third socket ceiling 2020 (shown with reference to FIG. 20), a fourth arc shaped socket 1946, and a fourth socket ceiling 2022 (shown with reference to FIG. 20). Translating link 112 may include translating plate 122 that extends between third joint 124 and fourth joint 126. Third joint 124 may include third shaft 1908, third arc shaped socket 1944, and third socket ceiling 2020. Third arc shaped socket 1944 is sized and shaped to hold third shaft 1908. Third socket ceiling 2020 is mounted over the middle portion of third shaft 1908 to further hold third shaft 1908 in position. Fourth joint 126 may include fourth shaft 1910, fourth arc shaped socket 1946, and fourth socket ceiling 2022. Fourth arc shaped socket 1946 is sized and shaped to hold fourth shaft 1910. Fourth socket ceiling 2022 is mounted to over the middle portion of fourth shaft 1910 to further hold fourth shaft 1910 in position.

First shaft 1904 is inserted in first arc shaped socket 1914 below first socket ceiling 2400 and between the second pair of retainer clips 1930, and the second pair of abutment walls 1932 to mount base part 1900 to third curved link 110c. Second shaft 1906 is inserted in second arc shaped socket 1916 below second socket ceiling 1918 and between the fourth pair of retainer clips, and the fourth pair of abutment walls to mount base part 1900 to fourth curved link 114c. Third shaft 1908 is inserted in third arc shaped socket 1944 below third socket ceiling 2020 and between the first pair of retainer clips 1926, and the first pair of abutment walls 1928 to mount translating part 1902 to third curved link 110c. Fourth shaft 1910 is inserted in fourth arc shaped socket 1946 below fourth socket ceiling 2022 and between the third pair of retainer clips 1938, and the third pair of abutment walls 1940 to mount translating part 1902 to fourth curved link 114c.

Figure 22:
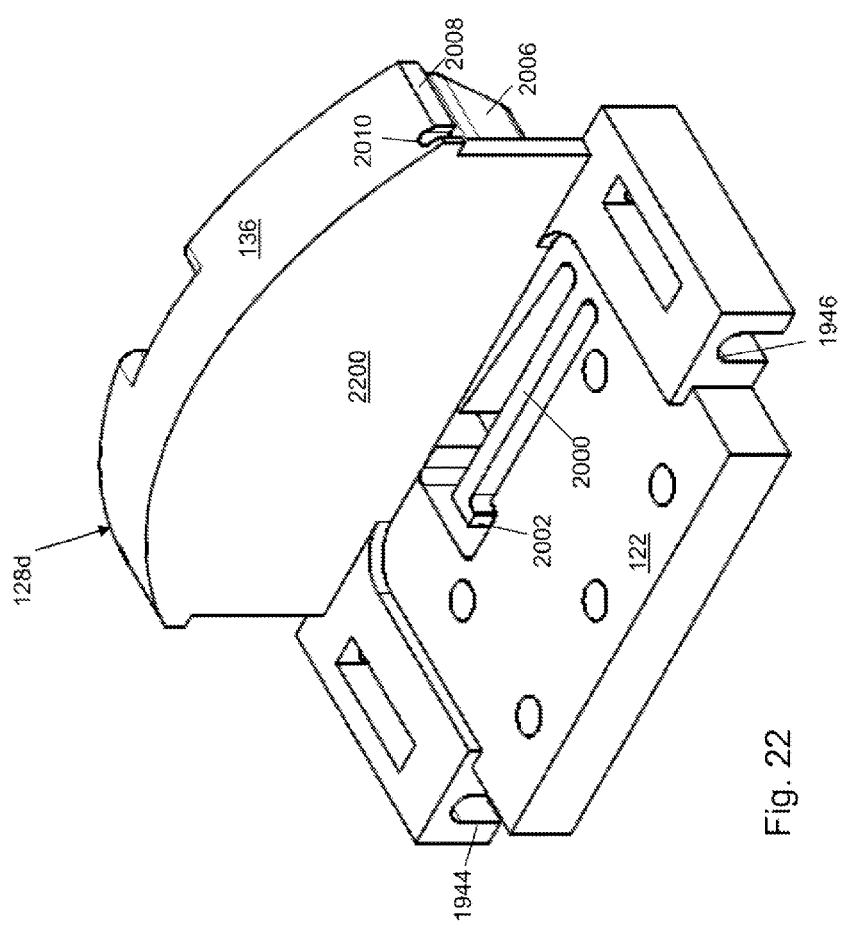
FIG. 22 depicts a right, bottom, back perspective diagram of the translating part of the actuating device of FIG. 18.

With reference to FIGS. 20-22, an enlarged view of translating part 1902 is provided. FIG. 20 depicts a right, top, front perspective diagram of translating part 1902. FIG. 21 depicts a left, top, front perspective diagram of translating part 1902. FIG. 22 depicts a right, bottom, back perspective diagram of translating part 1902.

Translating plate 122 may include an integral flexure spring 2000 cut through the surface of translating plate 122. Fourth drive 128d is mounted to extend down from translating plate 122 in a generally perpendicular direction. Fourth drive 128d may include arc surface 136, a fourth front drive surface 138d, a fifth side surface 2100 (shown with reference to FIG. 21), a sixth side surface 2006, and a second back drive surface 2200 (shown with reference to FIG. 22). Fourth drive 128d may be hollow or solid.

In an illustrative embodiment, cable 132, as described with reference to FIGS. 7 and 8, is used in sixth drive system 104f to mount fourth drive 128d to shaft 130. A first end of cable 132 is mounted to a tip 2002 of integral flexure spring 2000. A second end of cable 132 is mounted to a termination hole 2004 cut in sixth side surface 2006. Between tip 2002 and termination hole 2004, cable 132 extends along fifth side surface 2100, through a first notch 2102 cut in a first edge 2104 (shown with reference to FIG. 21) of fifth side surface 2100, along a first portion of arc surface 136, around shaft 130, along a second portion of arc surface 136, through a second notch 2010 cut in a first edge 2008 of sixth side surface 2006, and along sixth side surface 2006. Arc surface 136 forms an arc shaped surface and extends between an edge of fourth front drive surface 138d, first edge 2104 of fifth side surface 2100, first edge 2008 of sixth side surface 2006, and an edge of second back drive surface 2200.

Figure 23:
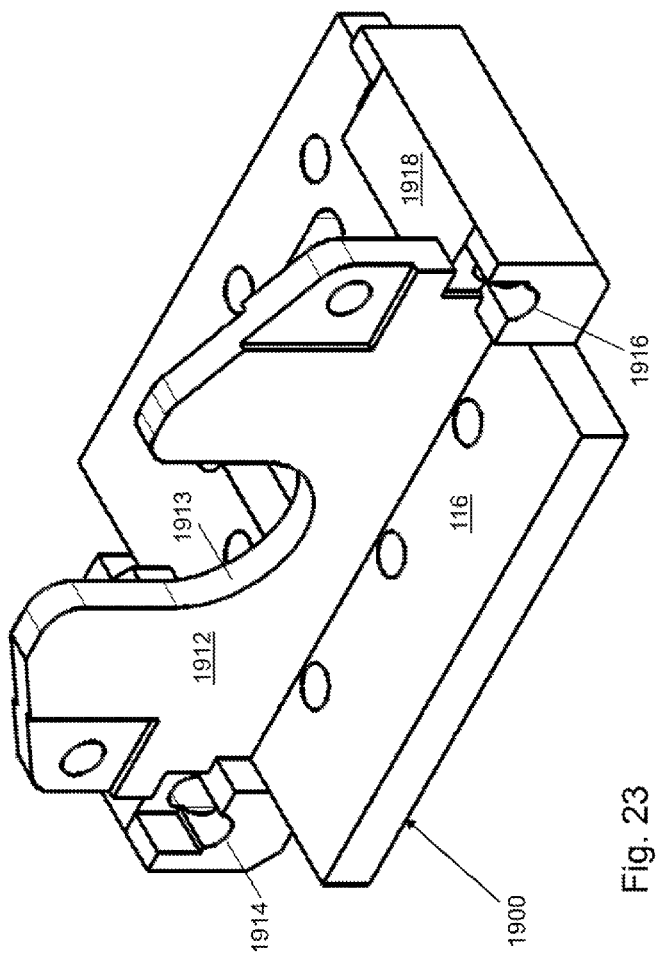
FIG. 23 depicts a right, top, front perspective diagram of a base part of the actuating device of FIG. 18.
Figure 24:
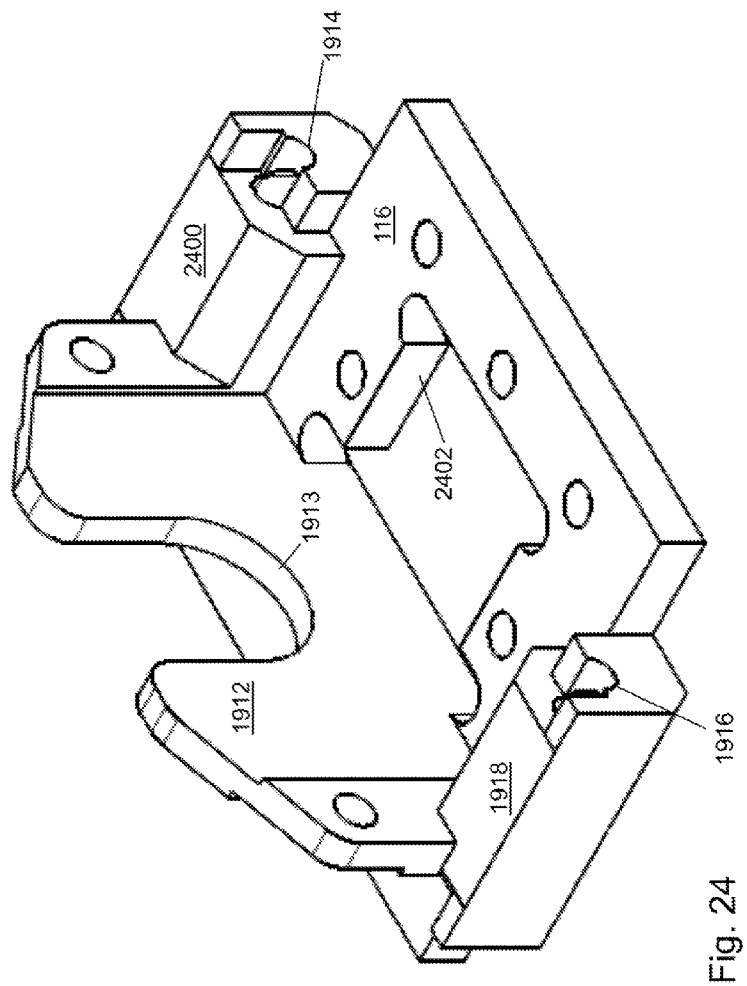
FIG. 24 depicts a right, top, back perspective diagram of the base part of the actuating device of FIG. 18.

With reference to FIGS. 23 and 24, an enlarged view of base part 1900 is provided. FIG. 23 depicts a right, top, front perspective diagram of base part 1900. FIG. 24 depicts a right, top, back perspective diagram of base part 1900. Base plate 116 may include an actuator cutout 2402 cut through the surface of base plate 116 and sized and shaped to hold actuator 106 in position relative to base link 108. Actuator 106 can be mounted to base plate 116 using fasteners, adhesives, ultrasonic welding, etc. Actuator cutout 2402 may further provide an exit pathway for routing of electrical cables.

As an example, eighth actuating device 1800 can be used where a small, low-cost device for precision motion with low interaction forces is desired. Fifth 4-bar linkage 102e may be designed to be injection molded out of acrylonitrile butadiene styrene or similar plastic material using low-cost straight-pull molds. The shafts 1904, 1906, 1908, 1910 of first joint 118, second joint 120, third joint 124, and fourth joint 126, respectively, may be formed of standard mass-produced precision ground dowel pins. Actuator 106 may comprise a stepper motor such as a Portescap 26M048B1B or similar low-cost motor capable of microstepping operation. Press-fit holes for the shafts 1904, 1906, 1908, 1910 of first joint 118, second joint 120, third joint 124, and fourth joint 126, respectively, may be provided on base plate 116 and translating plate 122. Alternatively, the shafts 1904, 1906, 1908, 1910 of first joint 118, second joint 120, third joint 124, and fourth joint 126, respectively, can be inserted into the mold prior to the injection molding process and molded in place.

Eighth actuating device 1800 includes features for preloading and routing cable 132. Cable 132 is first looped around tip 2002 of integral flexure spring 2000, routed around two corners of fifth side surface 2100, and through first notch 2102 leading to arc surface 136. Cable 132 is then wrapped along arc surface 136, wrapped several times around shaft 130, then through second notch 2010. Cable 132 is then pulled tight such that integral flexure spring 2000 deflects by the desired amount and clamped in place by tightening a screw inserted into termination hole 2004. Integral flexure spring 2000 simplifies manufacturing and assembly, but may creep over time depending on the part material and environmental conditions. A metal leaf spring or extension spring may be used instead of integral flexure spring 2000, either molded in place or installed during assembly. If cable 132 has sufficient compliance and low enough creep or stretch over time, a separate spring may not need to be used.

First joint 118, second joint 120, third joint 124, and fourth joint 126 connect the links 108, 110*c*, 112, and 114*c* such that the angles of the parallelogram can be deflected by a large amount, for example up to +/−45 degrees. The motion range of eighth actuating device 1800, assuming a +/−45 degree angle range, is approximately 1.4 times the length of the "side" links, third curved link 110*c* and fourth curved link 114*c* of fifth 4-bar linkage 102*e*, which is much larger than the motion range obtainable using a similarly sized leaf-spring flexure device and approaches that of a serial link manipulator with equivalent link lengths.

Figure 25:
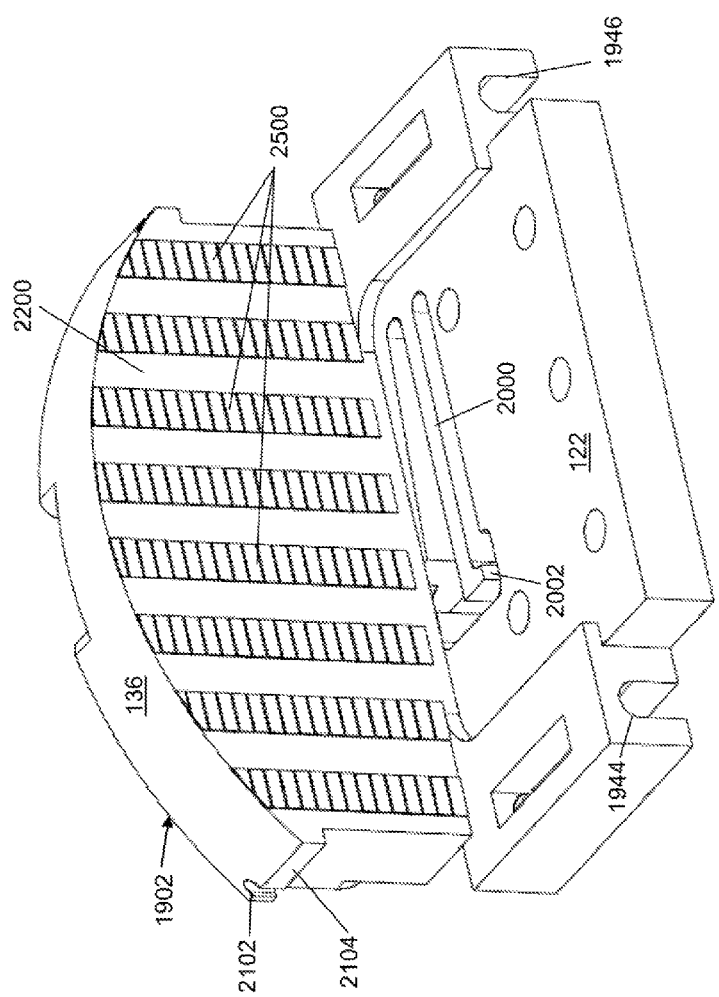
FIG. 25 depicts a right, bottom, back perspective diagram of the translating part of the actuating device of FIG. 18 with encoder markings in accordance with a first illustrative embodiment.
Figure 26:
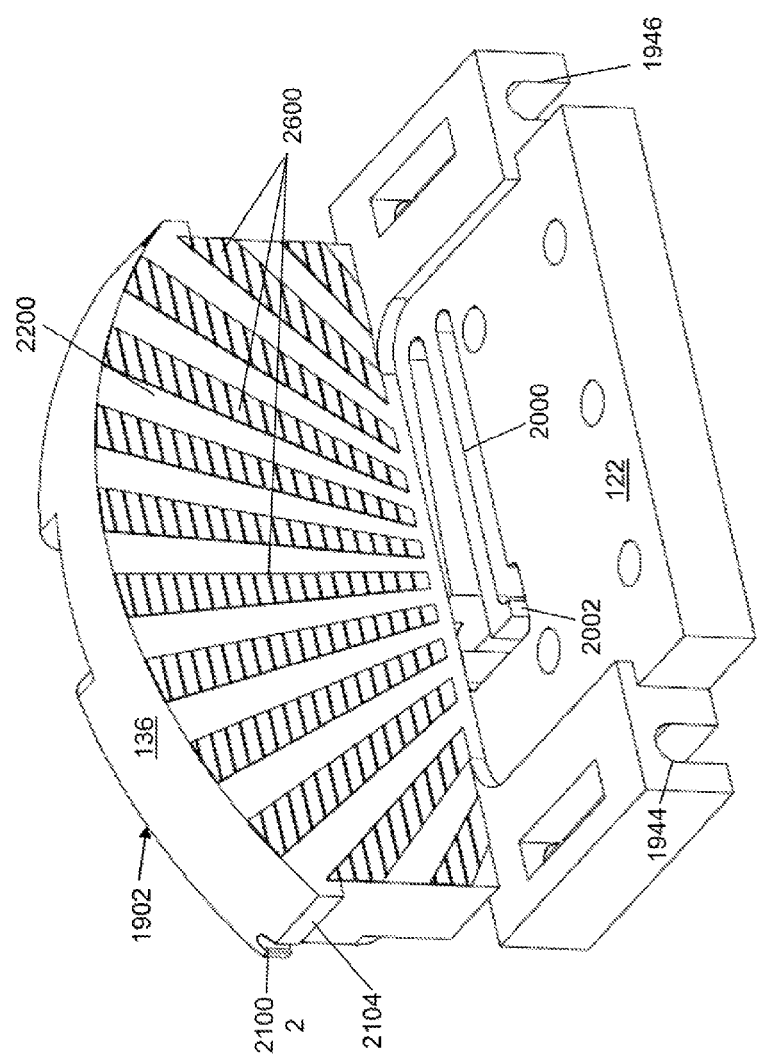
FIG. 26 depicts a right, bottom, back perspective diagram of the translating part of the actuating device of FIG. 18 with encoder markings in accordance with a second illustrative embodiment.

For some applications, the output position of actuator 106 may be sensed by using a standard optical encoder, resolver, hall sensors, or other rotational position sensor. A sensorless electronic technique may also be used to determine the actuator position. However, it may be desirable to directly sense the position of translating link 112 relative to base link 108. For example, the simpler cabling scheme of FIGS. 7 and 8 may be preferred, but slippage of cable 132 on shaft 130 might need to be detected. In this case, a sensing target can be provided on second back surface 2200 and a sensor mounted near a face of actuator 106 on base link 108, preferably centered above shaft 130. With reference to FIG. 25, a right, bottom, back perspective diagram of translating part 1902 is shown with first encoder markings 2500 on second back surface 2200. With reference to FIG. 26, a right, bottom, back perspective diagram of translating part 1902 is shown with second encoder markings 2600 on second back surface 2200. Any standard rotational or linear non-contact position sensing device can be used for this purpose, including optical encoders, reflectance sensors, and magnetic encoders. If it is desirable for the sensor to measure the linear translational motion of actuator 106, a linear scale such as that provided by first encoder markings 2500 may be used. However, if it is desirable to measure the translational motion along the arc traversed, a rotational scale such as that provided by second encoder markings 2600 may be used. While the linear translational displacement and arc translational displacement are related by a simple relation, it may be preferable to sense one or the other of them directly, for example, to simplify controller computations or maximize sensor resolution. Depending on the type of sensor, first encoder markings 2500 and second encoder markings 2600 may take the form of an adhesive-backed printed pattern, a precision fine-pitch pattern on a plastic or glass scale, an alternating pole magnetic sheet, physical grooves molded into second back surface 2200, etc.

Some sensors are sensitive to the gap between the sensor and the target being sensed, for example, by detecting the root-mean-squared amplitude of a pair of quadrature outputs of a reflective optical sensor, and not just the quadrature angle. This gap may vary based on manufacturing tolerances, but will also change based on transverse flexing of the 4-bar linkage, reflecting interaction forces. For applications where multiple actuators of this type are stacked in differing directions, combining the multiple gap measurements can serve as a crude multi-axis low-cost force or collision detection.

If actuator 106 is used in an application where it will experience a constant load force, for example, a gravity load, a counterbalance can be installed to reduce the torque requirements of actuator 106. This counterbalance may be a hanging weight on a pulley, a constant force spring, a linear spring, etc.

For some scientific and medical applications, it may be desirable to fabricate the described actuating devices out of components that can withstand steam autoclaving. For example, the 4-bar linkage and drive can be fabricated out of stainless steel, anodized aluminum, or a high-temperature plastic such as polyetherimide or polypropylene. The joints can be polypropylene "living hinges", high-temperature plastic bushings, or stainless steel ball bearings. Similar to commercially available autoclavable motors, actuator 106 should be sealed with corrosion-resistant outer surfaces and have high temperature magnets, wiring, and electronic components. Any sensors should be able to withstand high temperatures and humidity (e.g. hall sensors detecting the position of high-temperature magnets). Cable 132 may formed of material that is resistant to corrosion and high temperatures, such as stainless steel, tungsten, or liquid crystal polymer (Vectran).

For high-volume, low-cost applications, the described actuating devices can be fabricated with integral "living hinges" with the base link, the translating link, and the two side links formed as a single injection molded part, such as that shown in FIG. 17*b*. Note that the designs shown in FIGS. 16-26 do not show draft angles (slopes) on vertical and other walls necessary for straight-pull injection molding, but could be easily adapted by one skilled in the art. Where many operational cycles are desired, a high fatigue resistant polymer may be used, such as polyethylene or polypropylene. Gear teeth used to form arc surface 136 could be designed into the molds, eliminating the need for a separate part, and resulting in an actuating device with only three easy to assemble low-cost components: an injection molded flexure with integral hinges and drive gear teeth, actuator 106 such as a stepper motor with integral shaft 130, and a pinion gear for shaft 130.

For applications where it is desirable to both translate and reorient an object, the described actuating devices can be used as rotational actuators by using one of the side links of the 4-bar linkage as the output link. For example, with reference to FIG. 27, a combined actuating device 2700 may include a first actuating device 100*a*, a second actuating device 100*b*, and a third actuating device 100*c*. First actuating device 100*a*, second actuating device 100*b*, and third actuating device 100*c* are mounted to control the position and orientation of tool 2702 within a plane, with second actuating device 100*b* providing the orientation control. Thus, the described actuating devices are well suited for use as modular actuating devices that can be combined and configured at assembly for rotational or translational use.

Optional covers may be used to provide a cleaner appearance and help shield the actuating device from liquids, dust, or other environmental problems that may interfere with the proper functioning of the actuating device. Thin injection molded or thermoformed plastic covers may be attached to one or more links of the 4-bar linkage, covering the otherwise open areas on the front and back of the actuating device and near the joints. Seals made of rubber, silicone, or other material, can be attached to the inside surfaces of the covers to provide additional environmental protection, although with added friction.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An actuating device comprising:
   a base link comprising a base plate, a first joint, and a second joint, wherein the base plate extends between the first joint and the second joint;
   a first link mounted to the first joint to allow rotation of the first link relative to the base plate at the first joint;
   a second link mounted to the second joint to allow rotation of the second link relative to the base plate at the second joint;
   a translating link comprising a translating plate, a third joint, and a fourth joint, wherein the translating plate extends between the third joint and the fourth joint, further wherein the first link is mounted to the third joint to allow rotation of the first link relative to the translating plate at the third joint, and further wherein the second link is mounted to the fourth joint to allow rotation of the second link relative to the translating plate at the fourth joint;
   a shaft configured to mount to an actuator such that the actuator causes rotation of the shaft, wherein, when operating the actuating device, a position of the shaft is fixed relative to the base plate; and
   a drive comprising an arc surface, wherein the drive is mounted to the translating link such that, when operating the actuating device, a position of the arc surface is fixed relative to the translating plate, and further wherein the shaft is mounted to the arc surface to cause translation of the translating link as the shaft rotates.

2. The actuating device of claim 1, wherein the first link is curved.

3. The actuating device of claim 2, wherein the second link is curved.

4. The actuating device of claim 1, wherein the drive is mounted to extend from the translating plate.

5. The actuating device of claim 4, further comprising the actuator, wherein the shaft is mounted to the actuator.

6. The actuating device of claim 5, wherein the actuator is mounted to the base plate.

7. The actuating device of claim 4, further comprising a housing comprising the base plate and a wall mounted to the base plate and extending from the base plate in a direction towards the translating plate, wherein the wall comprises an actuator support surface configured to support the actuator and to position the shaft relative to the arc surface.

8. The actuating device of claim 7, further comprising the actuator, wherein the shaft is mounted to the actuator.

9. The actuating device of claim 1, wherein the translating link further comprises an extension plate that extends from the fourth joint generally parallel to the translating plate, and further wherein the drive is mounted to extend from the extension plate.

10. The actuating device of claim 9, wherein the base link further comprises a base extension plate that extends from the second joint generally parallel to the base plate, and further wherein the actuator is mounted to the base extension plate.

11. The actuating device of claim 1, wherein the shaft is mounted within a space defined by the base plate, the first link, the second link, and the translating plate.

12. The actuating device of claim 1, further comprising a cable, wherein the shaft is mounted to the arc surface using the cable that winds around at least a portion of the shaft, extends along at least a portion of the arc surface, and mounts to the drive.

13. The actuating device of claim 1, further comprising a single cable, wherein the shaft is mounted to the arc surface using the single cable that mounts to the drive at a first point, extends along a first portion of the arc surface, winds around at least a portion of the shaft, extends along a second portion of the arc surface, and mounts to the drive at a second point.

14. The actuating device of claim 13, wherein an end of the single cable mounts to the translating link through a spring.

15. The actuating device of claim 1, wherein the shaft comprises a first plurality of teeth that extend from a surface of the shaft, and the arc surface comprises a second plurality of teeth that extend from the arc surface, wherein the first plurality of teeth mesh with the second plurality of teeth to mount the shaft to the arc surface.

16. The actuating device of claim 1, further comprising a cable comprising a first end and a second end, wherein the shaft is mounted to the arc surface using the cable that mounts to the drive at the first end, extends along a first portion of the arc surface, winds around a first portion of the shaft, and mounts to the shaft at the second end; and a second cable comprising a third end and a fourth end, wherein the shaft is further mounted to the arc surface using the second cable that mounts to the translating link at the third end, extends along a second portion of the arc surface, winds around a second portion of the shaft, and mounts to the shaft at the fourth end.

17. The actuating device of claim 16, wherein the third end of the second cable mounts to the translating link through a spring.

18. The actuating device of claim 1, wherein the shaft comprises a first frictional surface and the arc surface comprises a second frictional surface, wherein the shaft is mounted to the arc surface using a frictional force between the first frictional surface and the second frictional surface.

19. The actuating device of claim 1, further comprising a belt mounted to the shaft and to the drive, wherein the shaft is mounted to the arc surface using the belt.

20. The actuating device of claim 1, wherein a length of the first link measured between centers of the first joint and the third joint is approximately equal to a distance measured between a center of the shaft and a center of a circle on which the arc surface forms a part of the circumference.

* * * * *